United States Patent
D'Alessio et al.

(10) Patent No.: US 11,802,601 B2
(45) Date of Patent: Oct. 31, 2023

(54) SPRING FOR FRICTION PADS IN A DISC BRAKE CALIPER

(71) Applicant: FRENI BREMBO S.P.A., Curno (IT)

(72) Inventors: Davide D'Alessio, Curno (IT); Alberto Pendesini, Curno (IT); Andrea Mecocci, Curno (IT); Mauro Mambretti, Curno (IT)

(73) Assignee: Brembo S.p.A., Bergamo (IT)

( * ) Notice: Subject to any disclaimer, the term of this patent is extended or adjusted under 35 U.S.C. 154(b) by 345 days.

(21) Appl. No.: 17/253,762

(22) PCT Filed: Jun. 13, 2019

(86) PCT No.: PCT/IB2019/054937
§ 371 (c)(1),
(2) Date: Dec. 18, 2020

(87) PCT Pub. No.: WO2019/243958
PCT Pub. Date: Dec. 26, 2019

(65) Prior Publication Data
US 2021/0270335 A1 Sep. 2, 2021

(30) Foreign Application Priority Data
Jun. 20, 2018 (IT) .......................... 102018000006498

(51) Int. Cl.
*F16D 65/097* (2006.01)
*F16D 55/228* (2006.01)
(Continued)

(52) U.S. Cl.
CPC ....... *F16D 65/0977* (2013.01); *F16D 55/228* (2013.01); *F16D 65/0972* (2013.01);
(Continued)

(58) Field of Classification Search
CPC ............. F16D 65/0977; F16D 65/0972; F16D 65/0968; F16D 55/228; F16D 2055/0016; F16D 2127/02
(Continued)

(56) References Cited

U.S. PATENT DOCUMENTS 9,970,495 B2 * 5/2018 Crippa .................. F16D 55/225
10,240,649 B2 3/2019 Teruzzi et al.
(Continued)

FOREIGN PATENT DOCUMENTS

DE 4430956 A1 3/1996
DE 102016226054 A1 6/2017

OTHER PUBLICATIONS

European Patent Office, International Search Report with Written Opinion, issued in PCT/IB2019/054937, dated Sep. 9, 2019, 12 pages, European Patent Office, Rijswijk, Netherlands.

*Primary Examiner* — Christopher P Schwartz
(74) *Attorney, Agent, or Firm* — Marshall & Melhorn, LLC

(57) ABSTRACT

A spring for friction pads which can be associated with a caliper of a disc brake to bias the friction pads elastically away from a brake disc may have a central stretch and two opposite transverse stretches, extending from the central stretch in two opposite transverse directions and each forming a supporting stretch, a resting stretch and a wing stretch extending between the supporting stretch and the resting stretch. The supporting stretches lie on the same supporting plane and the wing stretch may have an ascending wing stretch and a descending wing stretch. The spring may also have one or more fixing stretches connected to the central stretch and forming at least two opposite fixing stretches for elastic snap fixing to corresponding fixing seats of the caliper.

16 Claims, 20 Drawing Sheets

(51) Int. Cl.
*F16D 65/00* (2006.01)
*F16D 55/00* (2006.01)
*F16D 127/02* (2012.01)

(52) U.S. Cl.
CPC .. *F16D 65/0068* (2013.01); *F16D 2055/0016* (2013.01); *F16D 2127/02* (2013.01)

(58) Field of Classification Search
USPC .......................................... 188/73.36–73.38
See application file for complete search history.

(56) References Cited

U.S. PATENT DOCUMENTS

| | | | |
|---|---|---|---|
| 2016/0003315 A1* | 1/2016 | Crippa | F16D 65/0974 188/72.3 |
| 2018/0003251 A1* | 1/2018 | Teruzzi | F16D 65/0975 |
| 2022/0056969 A1* | 2/2022 | Fumagalli | F16D 55/22 |
| 2022/0065312 A1* | 3/2022 | Crippa | F16D 55/228 |

\* cited by examiner

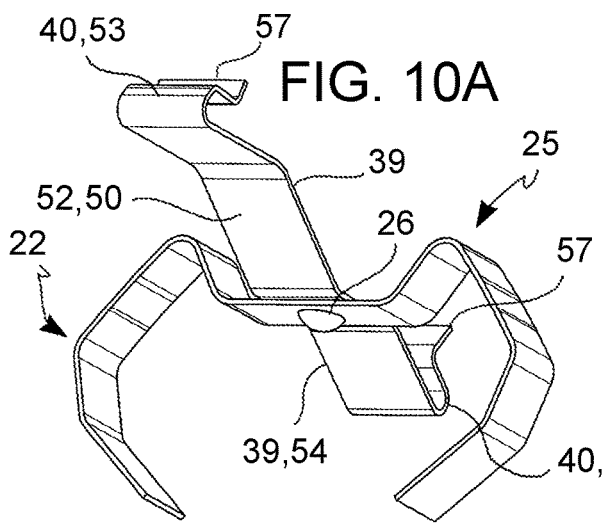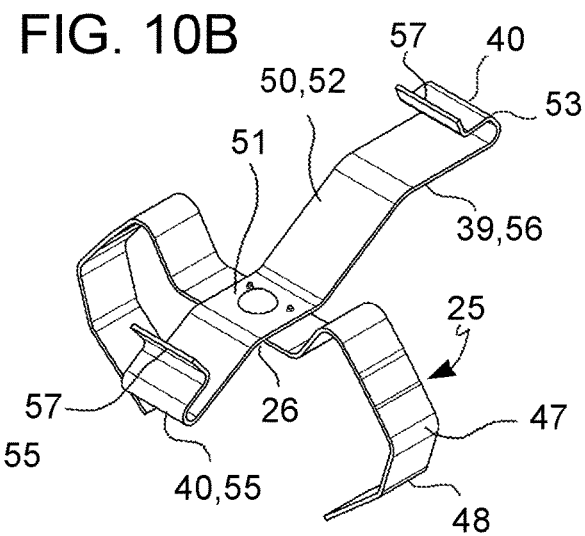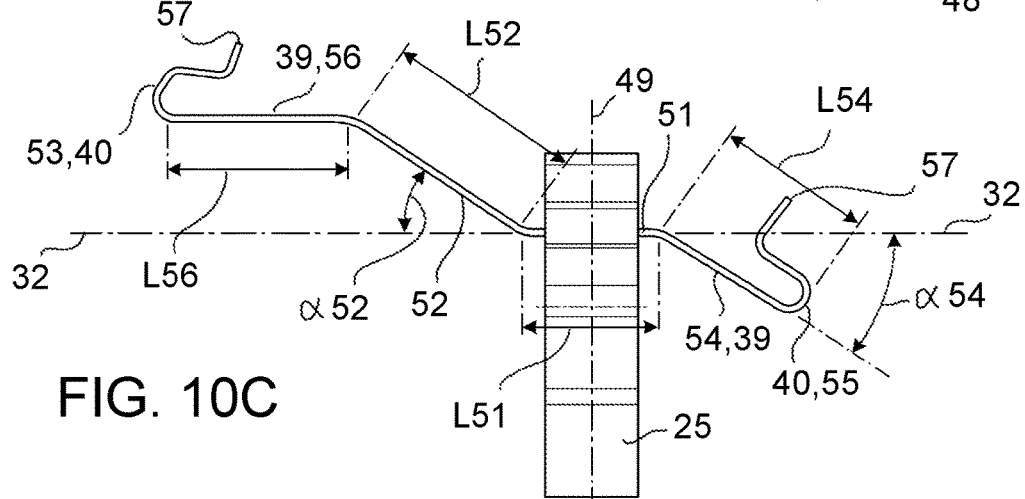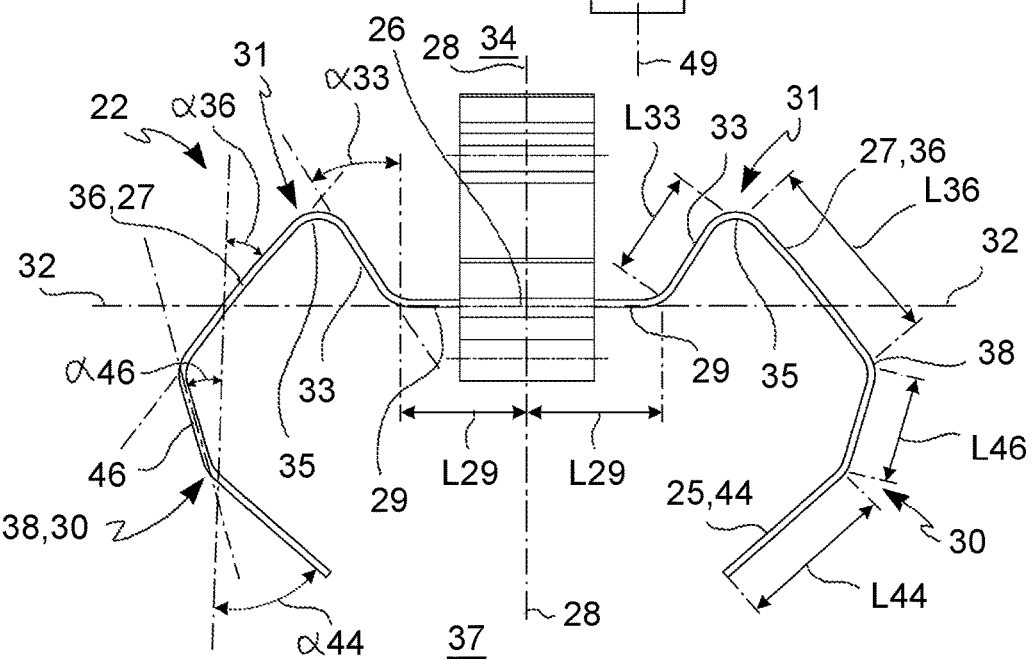

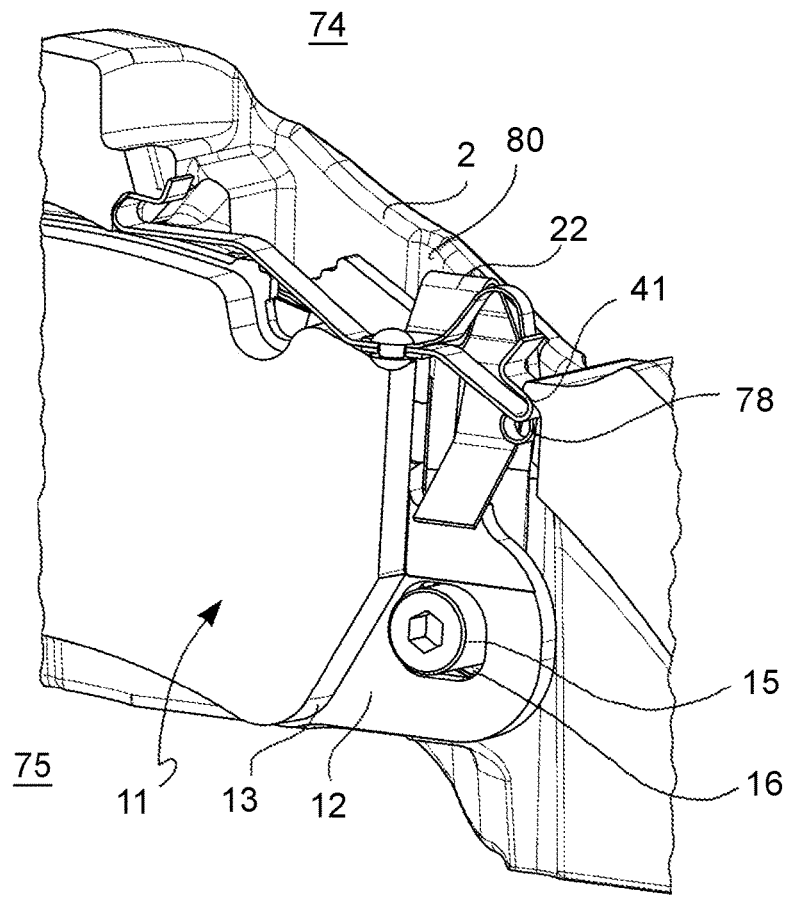
FIG. 21
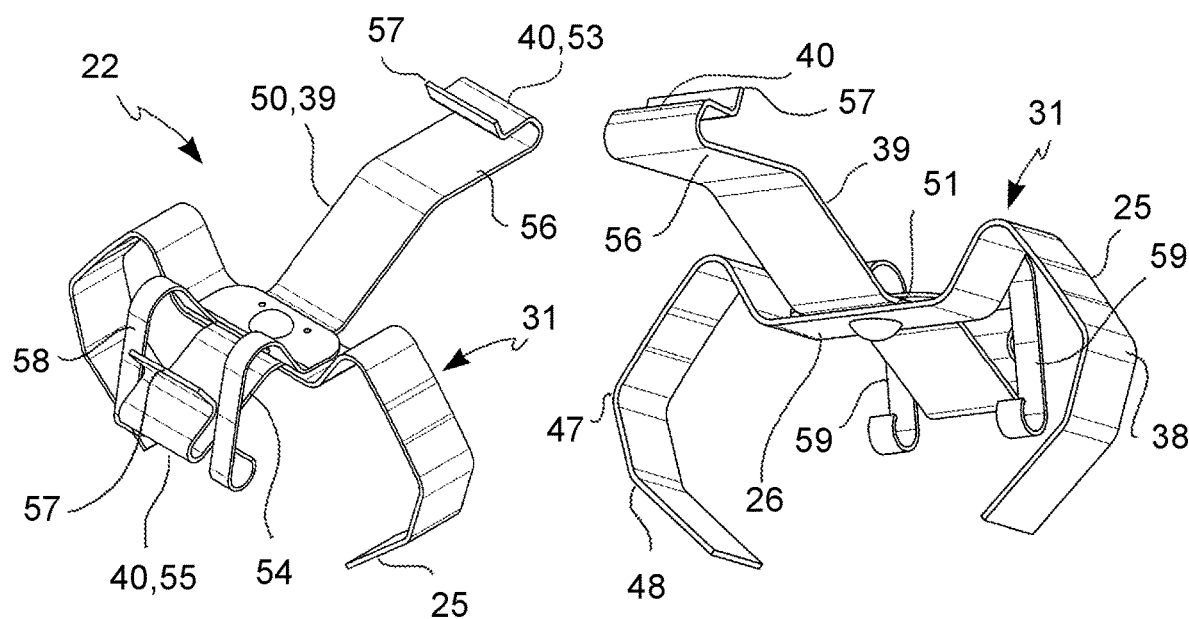
FIG. 22A
FIG. 22B

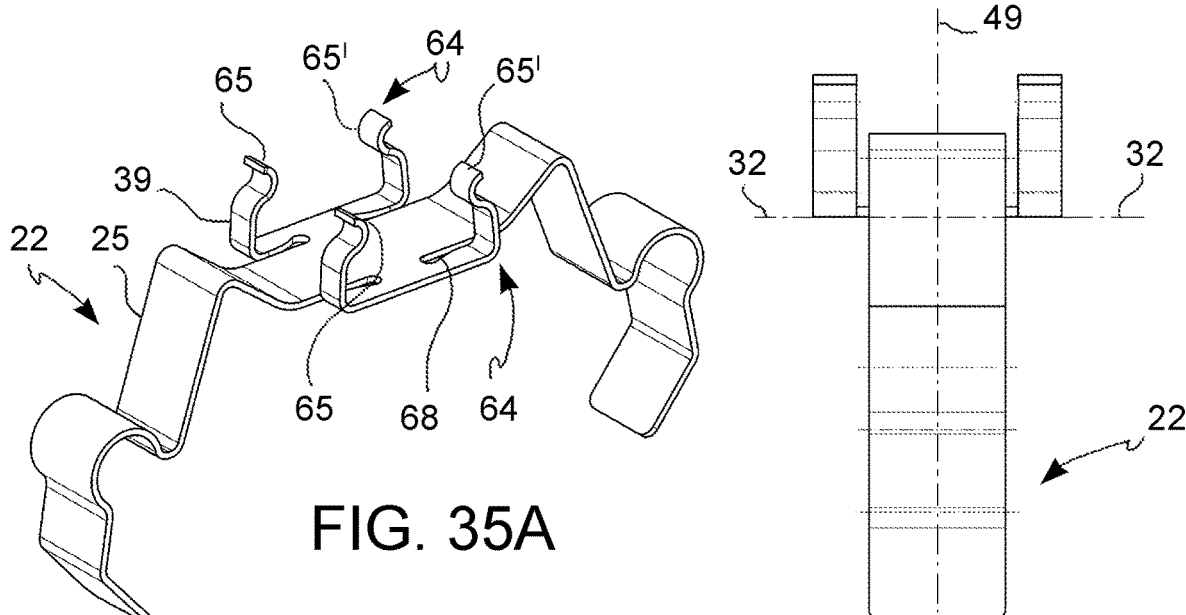
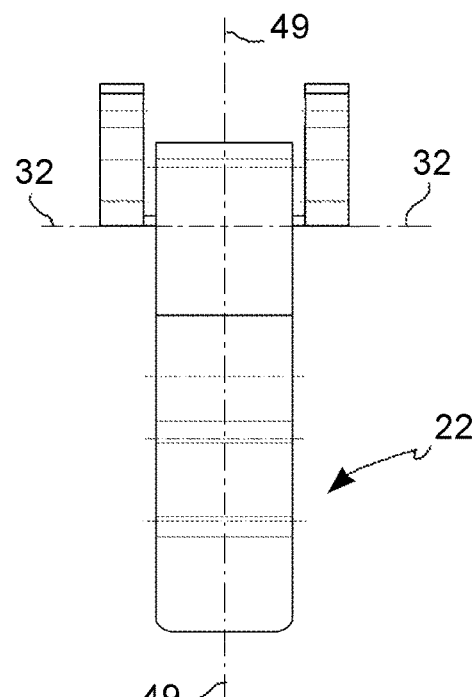
FIG. 35A
FIG. 35B
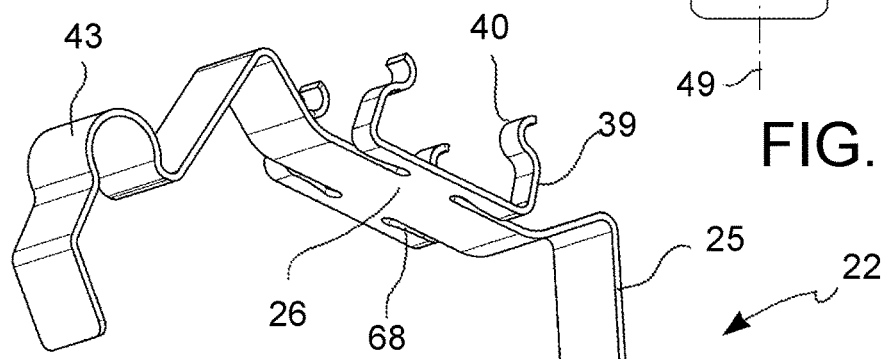
FIG. 35C
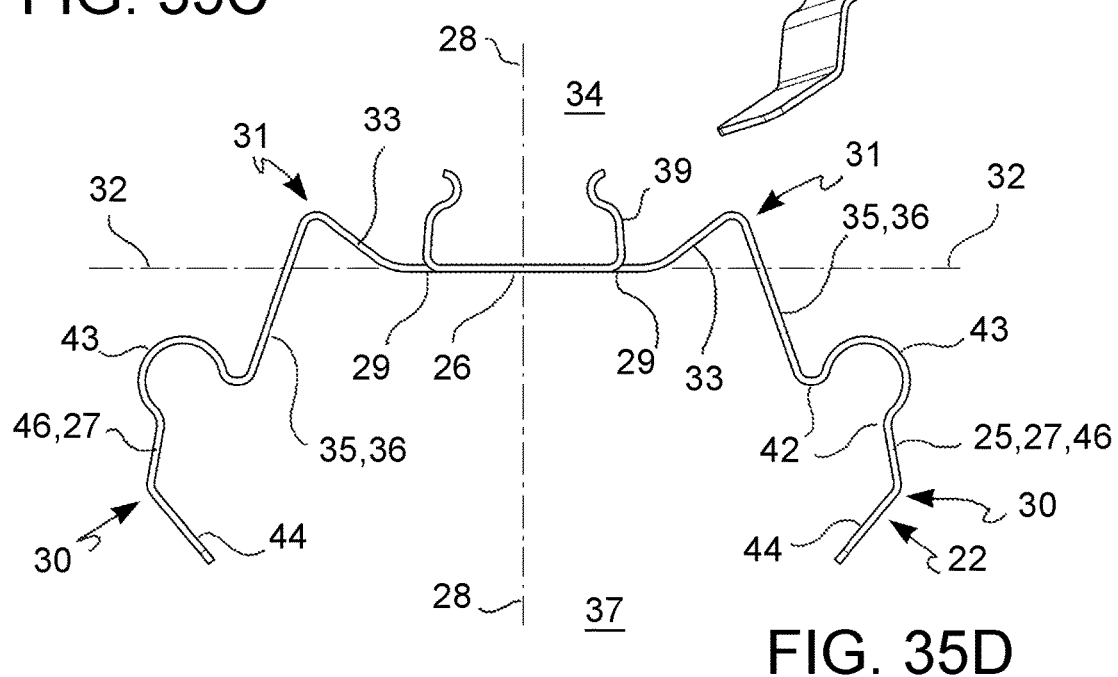
FIG. 35D

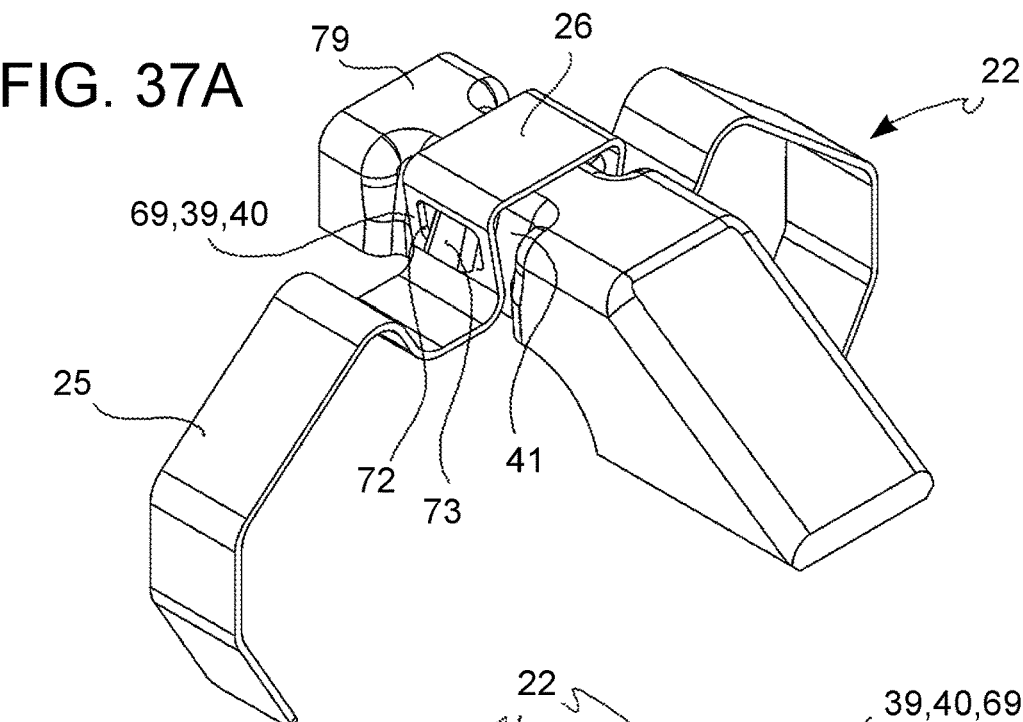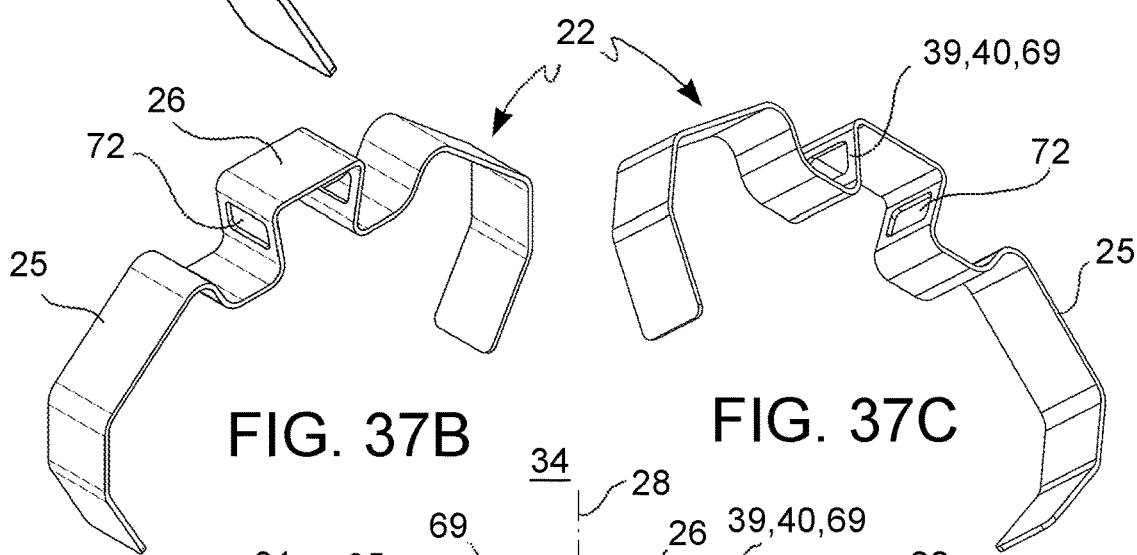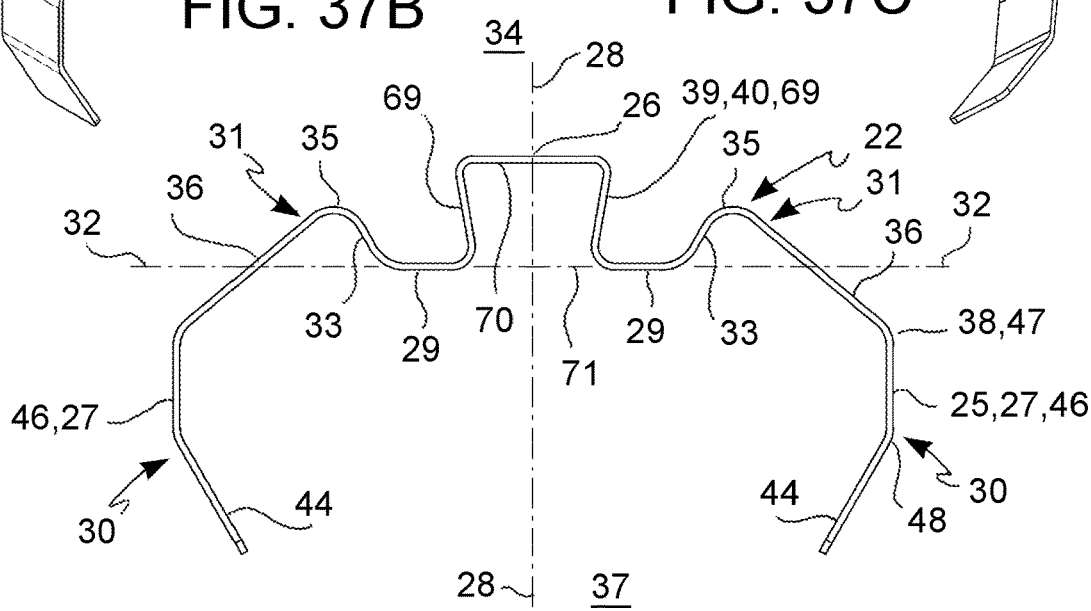

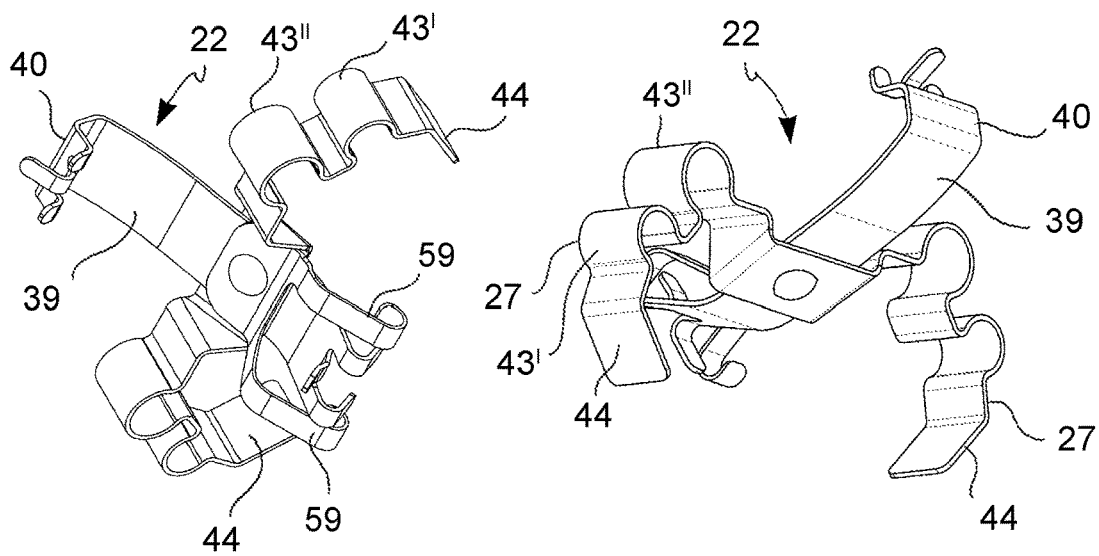
FIG. 38A
FIG. 38B
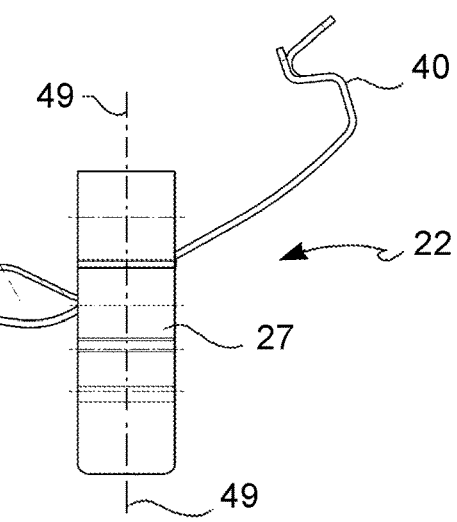
FIG. 38C
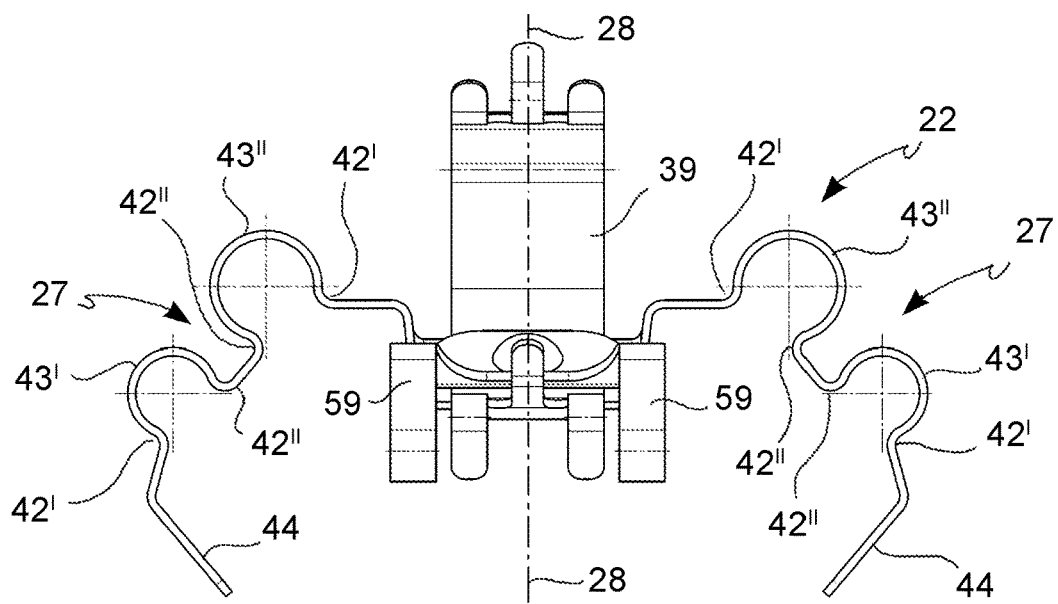
FIG. 38D

SPRING FOR FRICTION PADS IN A DISC BRAKE CALIPER

The present invention relates to a spring for elastically retaining and positioning the pads in a disc brake caliper, as well as to a disc brake equipped with such a spring.

Cross-shaped expansion springs for fixed caliper disc brakes provided with a longitudinal piece, the ends of which abut e.g. against two support pins which support the pads, and a cross piece, the ends of which abut against the upper edges of the pads in order to retain the pads elastically in a "lowered" position, are known. By virtue of an inclined configuration of the lower surface of the cross piece, the expansion springs bias the pads away from one another to ensure a separation of the pads from the brake disc after each braking.

The ends of the longitudinal piece of the known expansion springs usually engage both support pins from underneath and the cross piece of the expansion springs presses from above in a springing manner on the support plates of the pads.

The known expansion springs are thus used to obtain a three-fold action:
  reducing the vibrations of the pads,
  moving the brake pads away from the brake disc in order to reduce or eliminate a residual braking torque due to undesired contacts between the brake pads and the brake disc with the brake deactivated,
  obtaining a uniform wear of the friction linings of the pads.

The expansion springs of the prior art abut on the pads with an application angle of the elastic force of less than 15° with respect to the plane of the pad and hence transmit a high radial elastic force and a much lower elastic axial force to the pad. The axial elastic force moves the pads away from each other and from the brake disc along a planned axial sliding direction. In contrast with this, the radial elastic force generates, in the resting interfaces between the pads and the caliper, e.g. in resting interfaces between a support pin and a corresponding pad hole, a frictional resistance which opposes the axial thrust of the spring and thus the mutual separation of the pads.

With the expansion springs of the prior art, the axial elastic force is insufficient to overcome the frictional resistance generated by the elastic radial elastic force in complete and reliable manner in every operating condition of the brake.

An incomplete detachment between brake pads and disc thus often occurs with the brake deactivated, resulting in:
  undesired residual braking moments,
  unplanned pad positioning and orientation,
  non-uniform pad wear.

Furthermore, the axial elastic force applied by the expansion springs of the prior art varies according to the wear state (and therefore according to the axial position) of the friction pad.

Therefore, the application conditions of the elastic forces and thus the constraint conditions of the pads are uncertain, difficult to predict with precision and variable over time. The balance of the moments acting on the friction pad is undesirably sensitive to (and influenced by) frictions and by geometric variabilities.

It follows that the separation function of the pads from the brake disc is not ensured during the entire life cycle of the pad which gradually wears.

It is therefore the object of the present invention to provide an improved spring for pads and an improved disc brake having features such as to reduce the residual braking torque with the brake deactivated and to improve and make the separation function of the pads from the brake disc more uniform even in the presence of pad wear and during their entire life cycle.

In the scope of the general object of the invention, further objects relate to a reduction of the sensitivity (or in other words: an improvement of the robustness) of the elastic constraint system of the friction pads and in the balance of the moments acting on the friction pads, to geometric tolerances, friction effects and variations of the supporting conditions between the pads and the caliper and between the expansion spring and the pad.

These and other objects are achieved by a spring for pads and by a disc brake according to the claims. The dependent claims relate to advantageous and preferred embodiments.

In order to better understand the invention and appreciate its advantages, some non-limiting examples of embodiments will be described below with reference to the accompanying figures, in which:

FIGS. 10A, 10B, 10C, 10D are views of a spring for the friction pad adapted to be used in the disc brake according to figures from 1 to 9;

FIG. 21 is a perspective view of a detail of the disc brake in FIG. 11;

FIGS. 22A, 22B, 22C, 22D are views of a spring for the friction pad adapted to be used in the disc brake according to figures from 11 to 21;

FIGS. 35A, 35B, 35C, 35D are views of a spring for the friction pad adapted to be used in the disc brake according to figures from 23 to 34, according to an embodiment;

FIGS. 37A, 37B, 37C, 37D are views of a spring for the friction pad adapted to be used in the disc brake according to a further embodiment;

FIGS. 38A, 38B, 38C, 38D are views of a spring for the friction pad adapted to be used in the disc brake according to a further embodiment.

Figure 1:
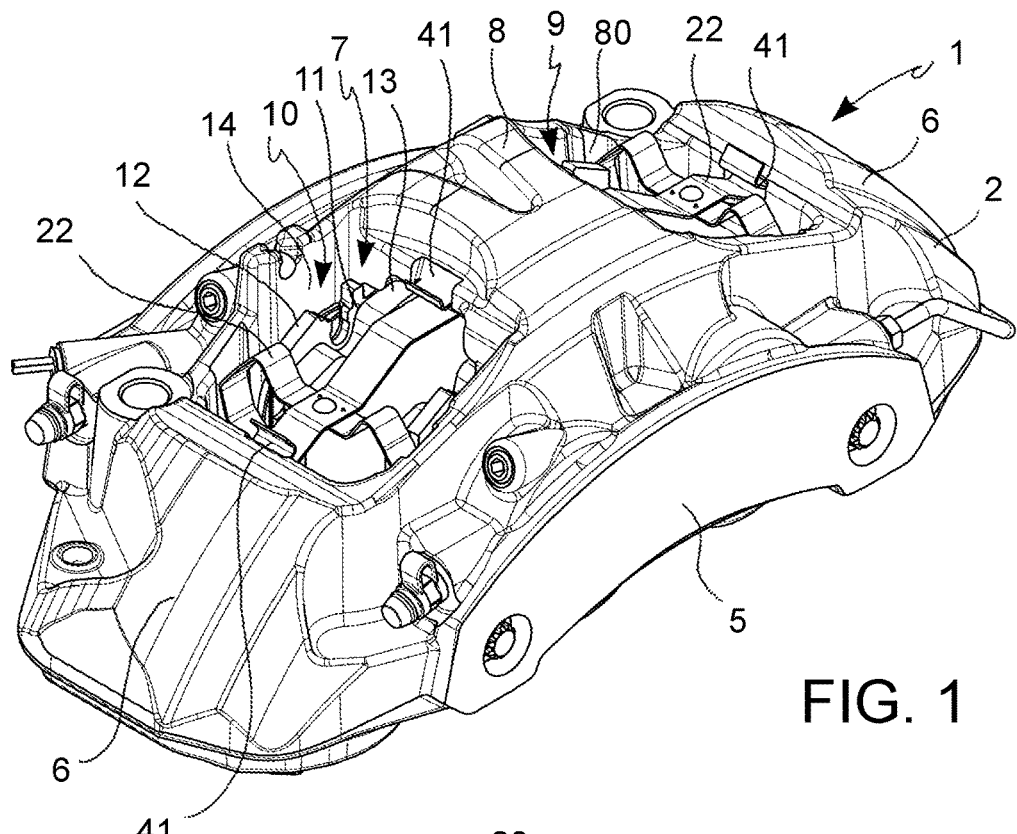
FIG. 1 is a perspective view of a disc brake according to an embodiment.
Figure 2:
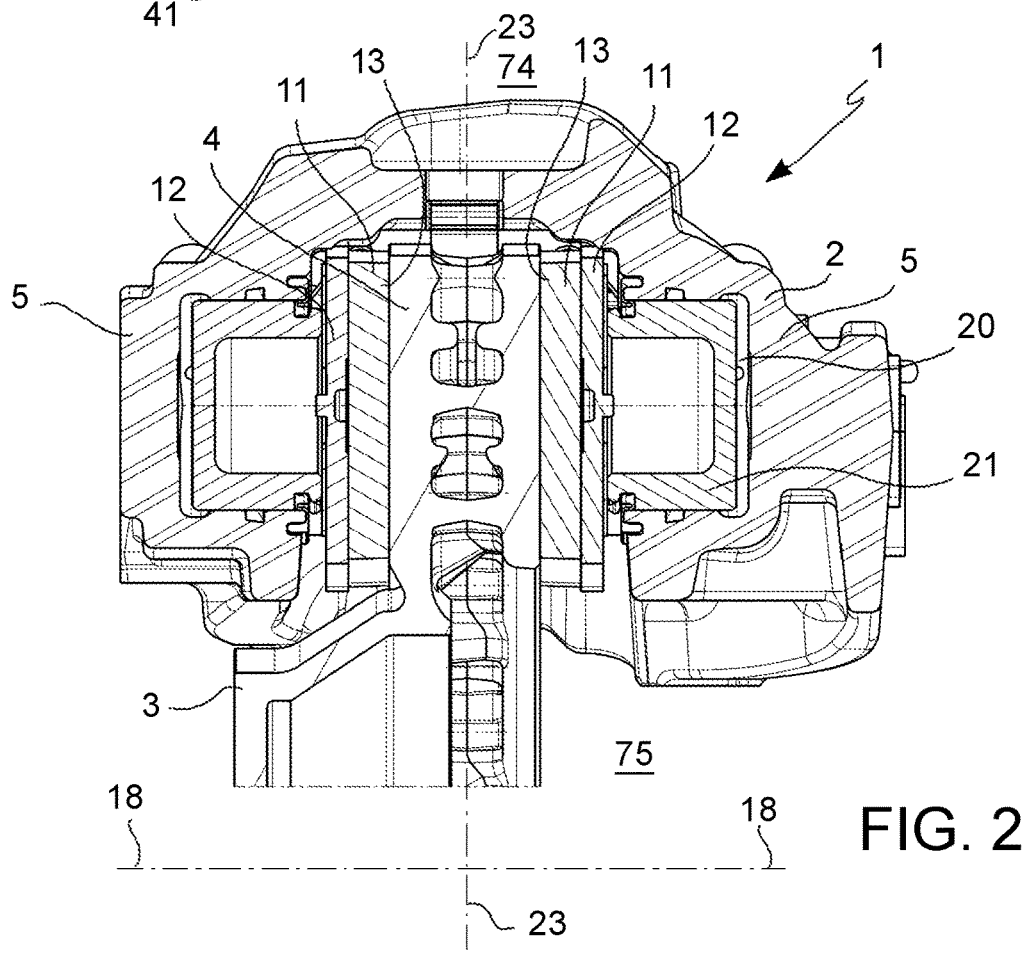
FIG. 2 is a radial section view (with respect to a rotation axis of a disc brake) of the disc brake in FIG. 1.

With reference to the figures, a disc brake, in particular for use on motor vehicles, is globally indicated by reference numeral 1. In the specific case, it is a disc brake of the fixed caliper type. However, the invention also applies to so-called floating calipers and to brakes with floating caliper.

The disc brake 1 comprises a caliper 2 and a brake disc 3. The caliper 2 can be fixed, e.g. by means of fixing screws, to a vehicle suspension, while the brake disc 3, provided with an annular braking band 4, can be connected to the wheel hub of the vehicle (not shown).

The caliper 2 comprises two side walls 5 which are arranged on both sides of the brake disc 3 and connected to each other by means of connecting elements which extend straddling the braking band 4 of the brake disc 3. Advantageously, the caliper 2 comprises two end bridges 6 delimiting a central opening 7, as well as at least or exactly one tie-rod 8 arranged in the central opening 7 and which structurally connects the two side walls 5 so as to limit the deformation of the caliper 2 during braking. Preferably, the tie-rod 8 is arranged approximately at the center of the central opening 7 so as to divide it into two half-openings 9, 10 of substantially equal circumferential extension (with reference to the rotation axis 18 of the brake disc 3).

At least two pads 11 having a support plate 12, e.g. made of steel, and a friction material lining 13, are each arranged on one side of the brake disc 3 at the braking band 4 and housed in dedicated seats 14 of the caliper 2 and supported by at least one, preferably two support pins 15. The size and mechanical strength of the support pins 15 is sufficient to allow the pads 11 to hang from or rest on such support pins 15, e.g. by means of a support hole or slot 16 formed in the support plate 12, preferably in a side end portion 17 or in two opposite side end portions 17 of the support plate 12, preferably in a radially inner half (with respect to the rotation axis 18 of the brake disc 3) and/or at or near a lower (i.e. radially inner) edge 19 of the support plate 12, in order to prevent radial displacements (related to the rotation axis 18 of the brake disc 3) of the friction pads 11. It is worth noting that the support pins 15 for the friction pads 11 generally do not contribute to the overall rigidity of the caliper 2.

The friction pads 11 are movable in axial direction perpendicular to the plane 23 of the brake disc 3 along the support pins 15 and are biased by thrust means, e.g. such as one or more hydraulic cylinder-piston units 20, 21 arranged in the caliper 2, so as to clamp, via the friction lining 13, a sector of the braking band 4, the surface and shape of which corresponds to those of the friction linings 13.

Figure 23:
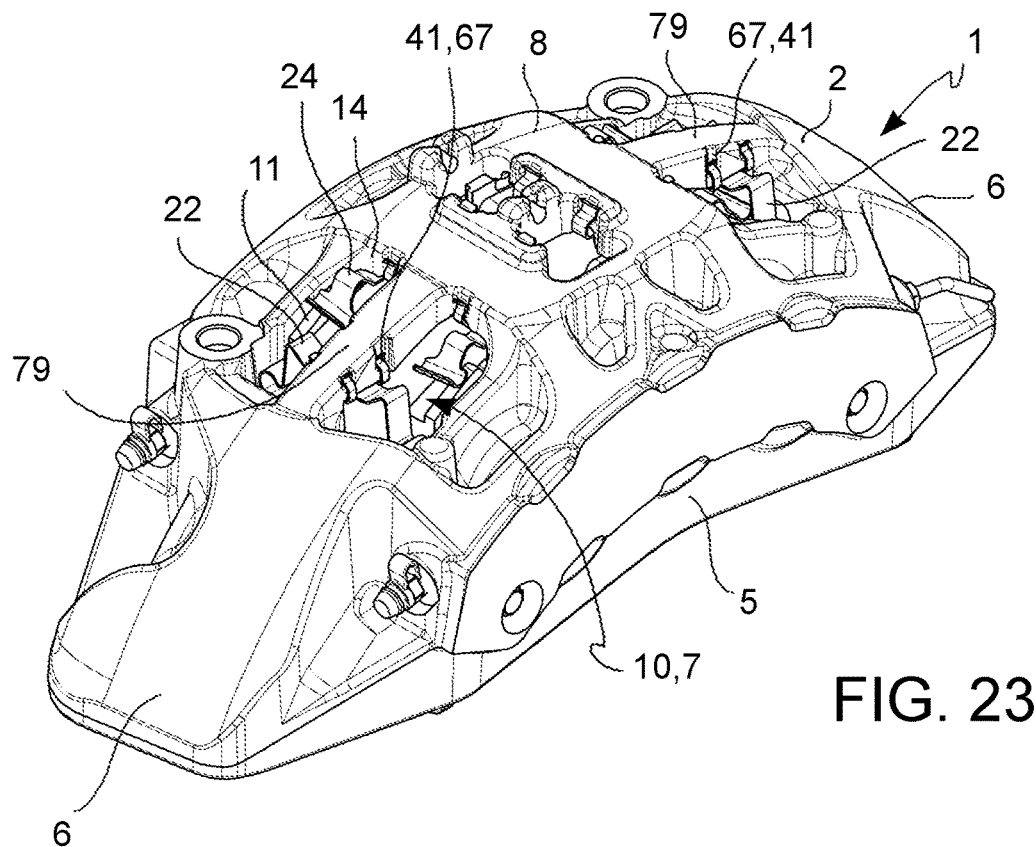
FIG. 23 is a perspective view of a disc brake according to an embodiment.
Figure 24:
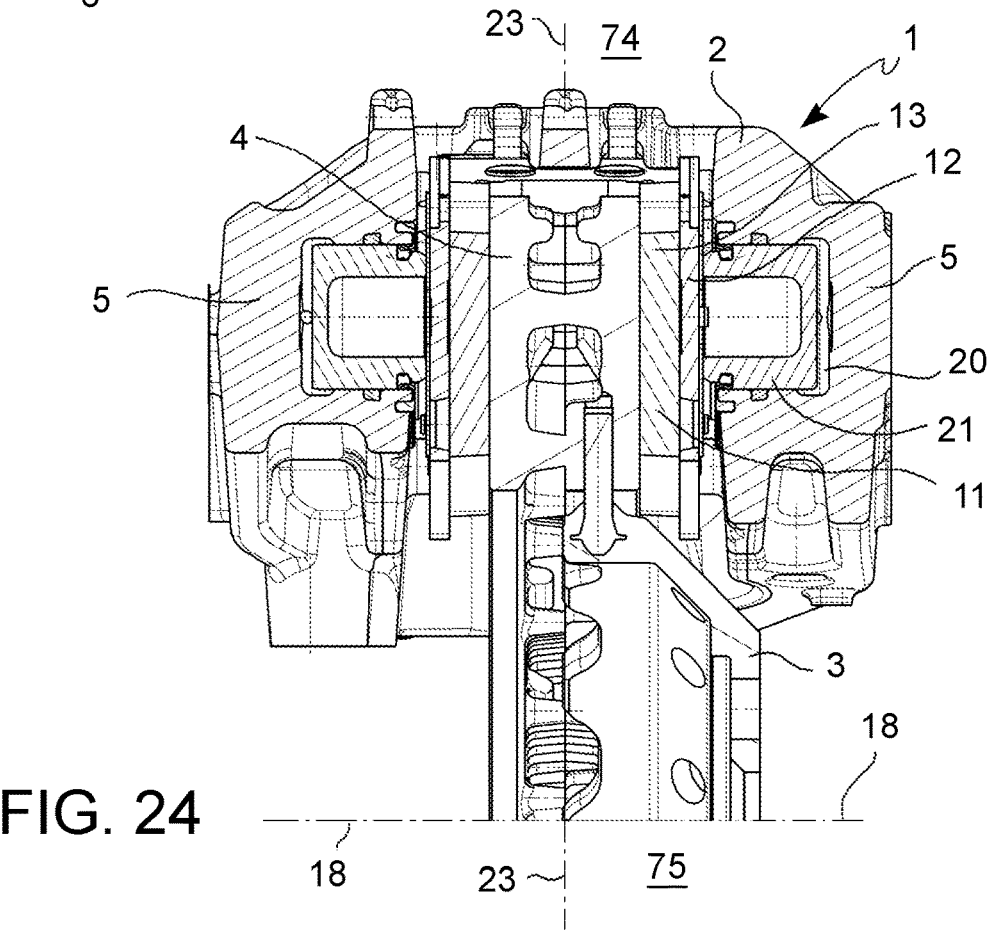
FIG. 24 is a radial section view (with respect to a rotation axis of a disc brake) of the disc brake in FIG. 23.
Figure 28:
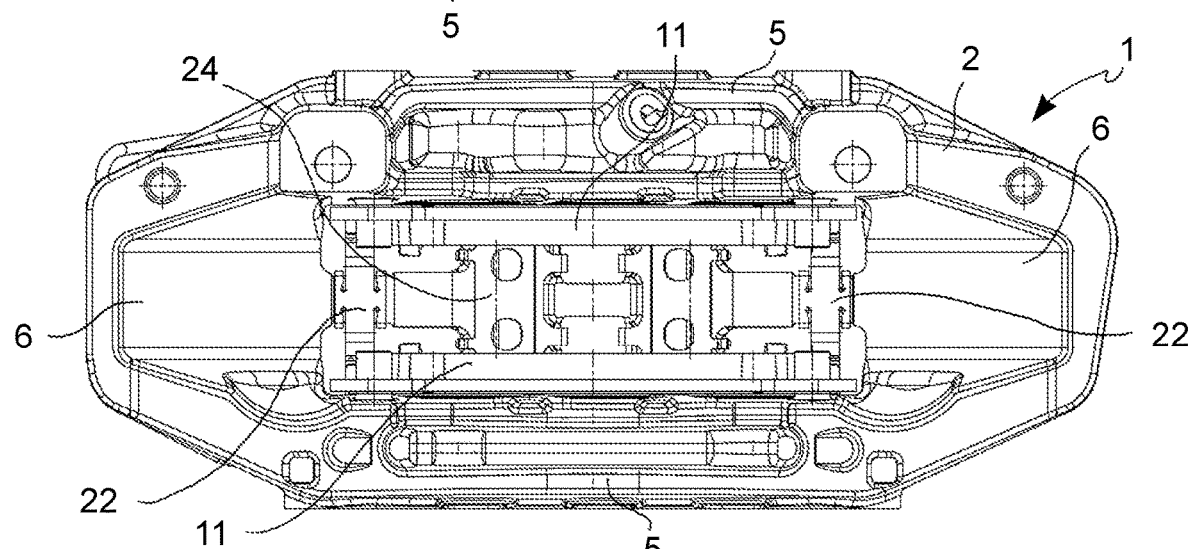
FIG. 28 is a bottom view of the disc brake in FIG. 23.
Figure 29:
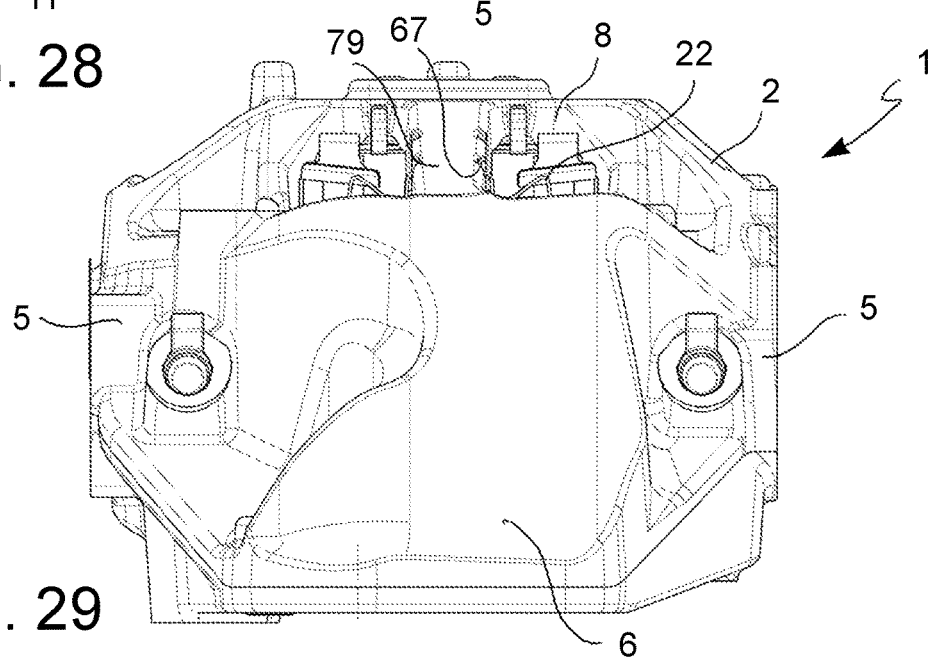
FIG. 29 is a rear view of the disc brake in FIG. 23.
Figure 30:
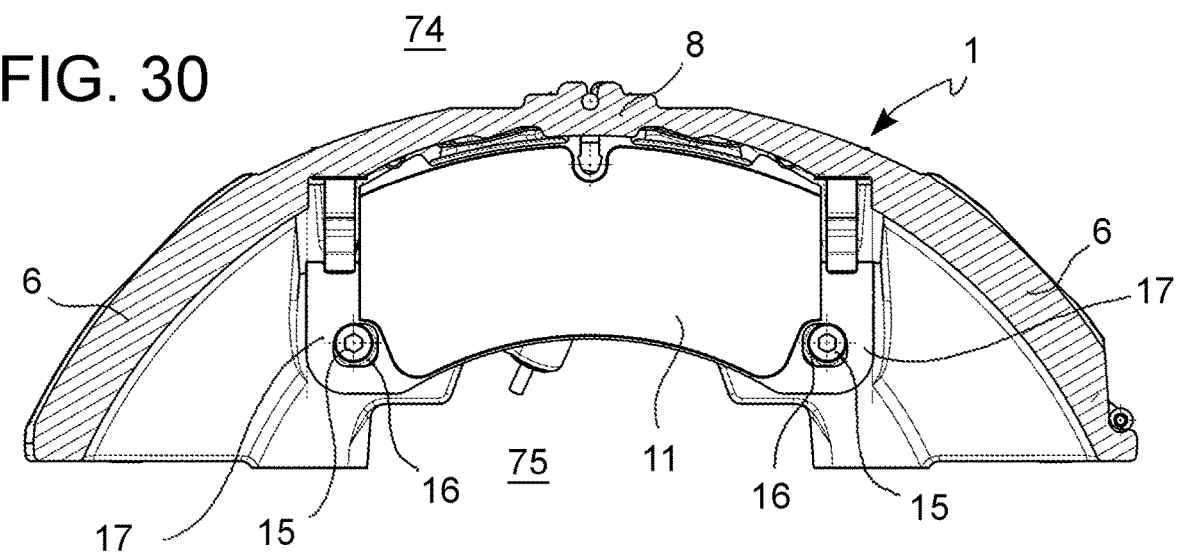
FIG. 30 is a section view of the disc brake in FIG. 23 taken along a section plane parallel to the disc plane, and with the brake disc removed for the sake of clarity.
Figure 31:
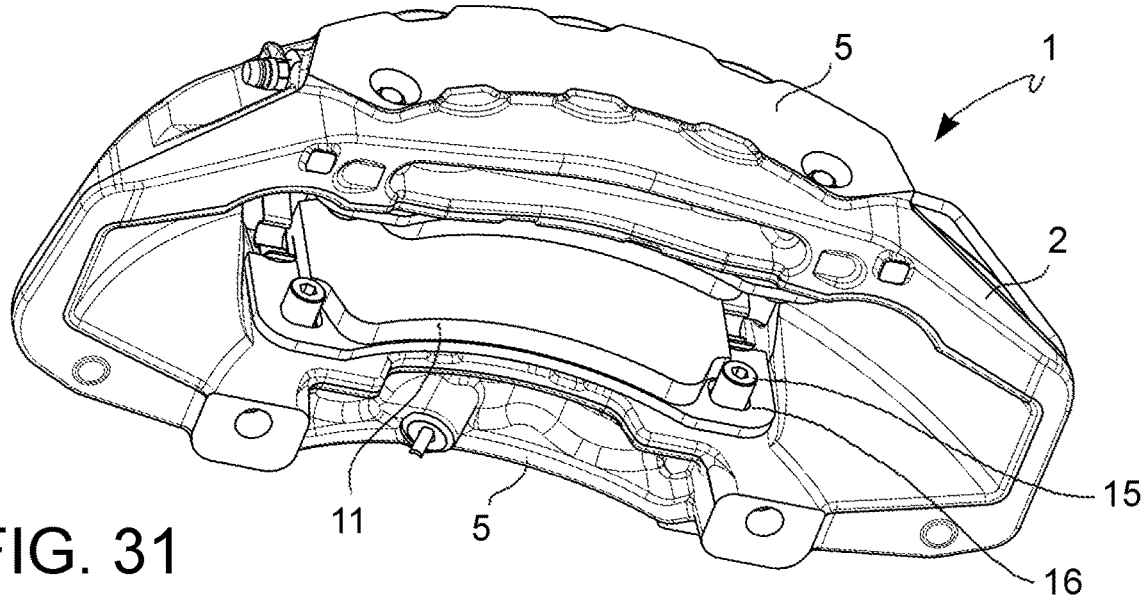
FIG. 31 is a perspective view of the disc brake in FIG. 23 with the brake disc removed for greater clarity.
Figure 32:
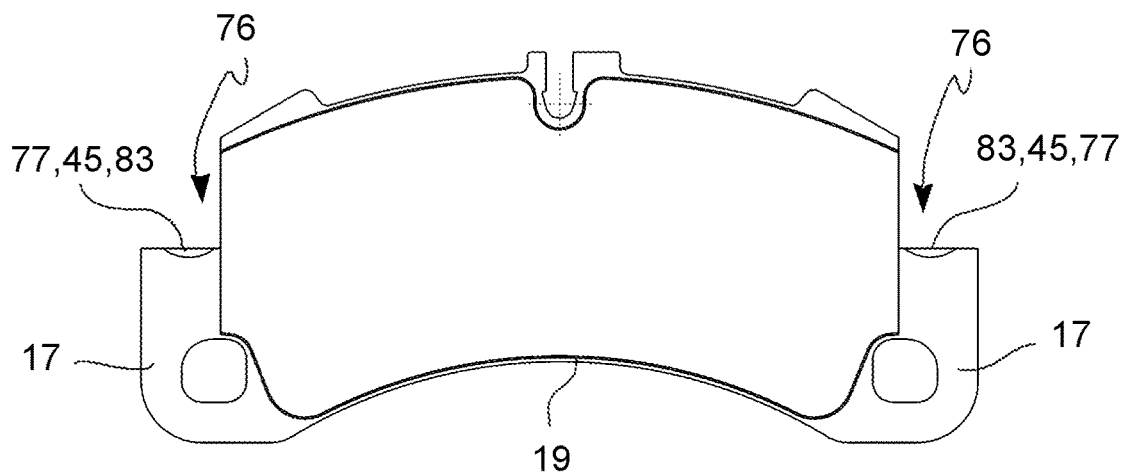
FIGS. 32 and 33 show a friction pad of the disc brake in FIG. 23, adapted for disc brakes according to preferred embodiments of the invention.
Figure 33:
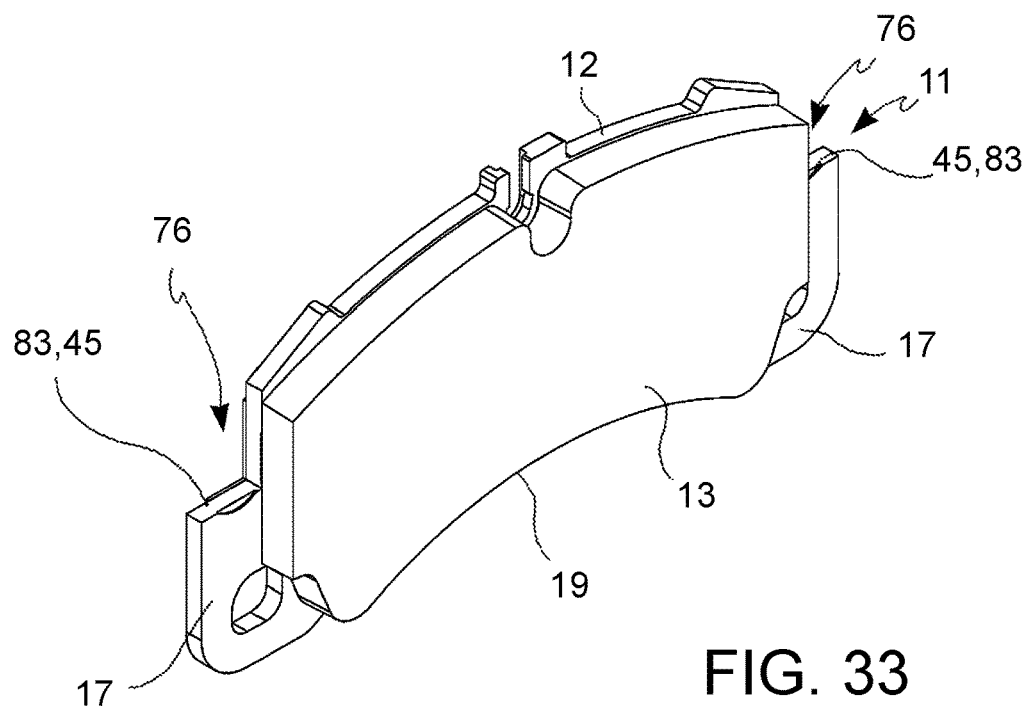
Figure 34:
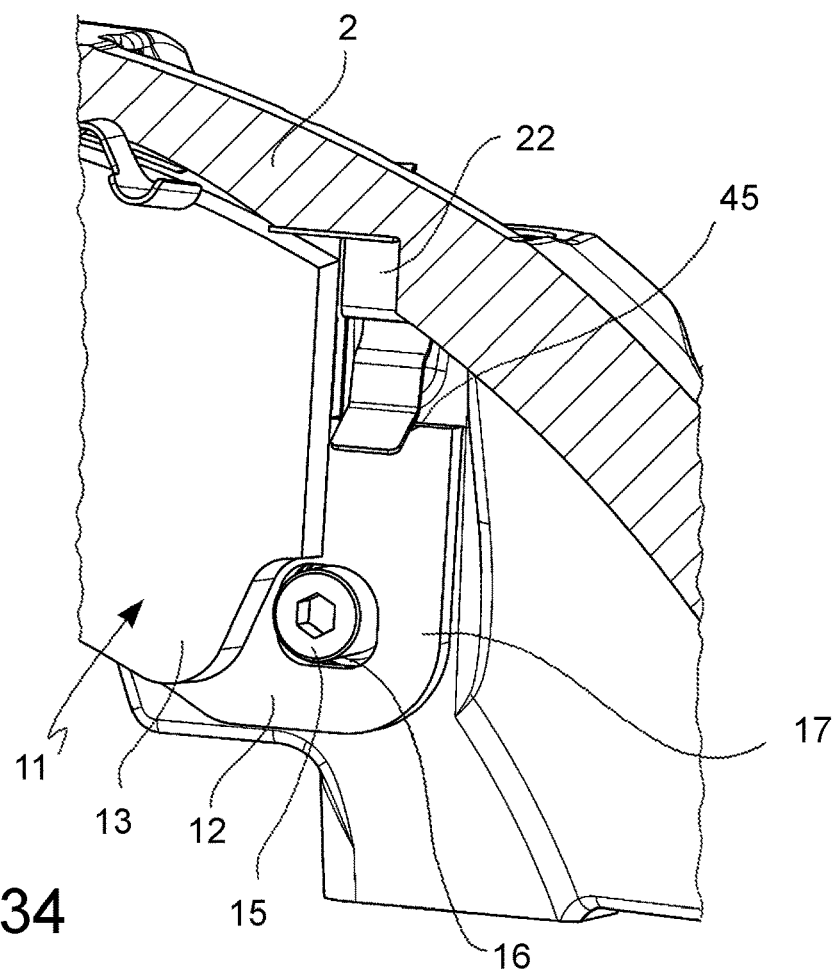
FIG. 34 is a perspective view of a detail of the disc brake in FIG. 23.
Figure 36A:
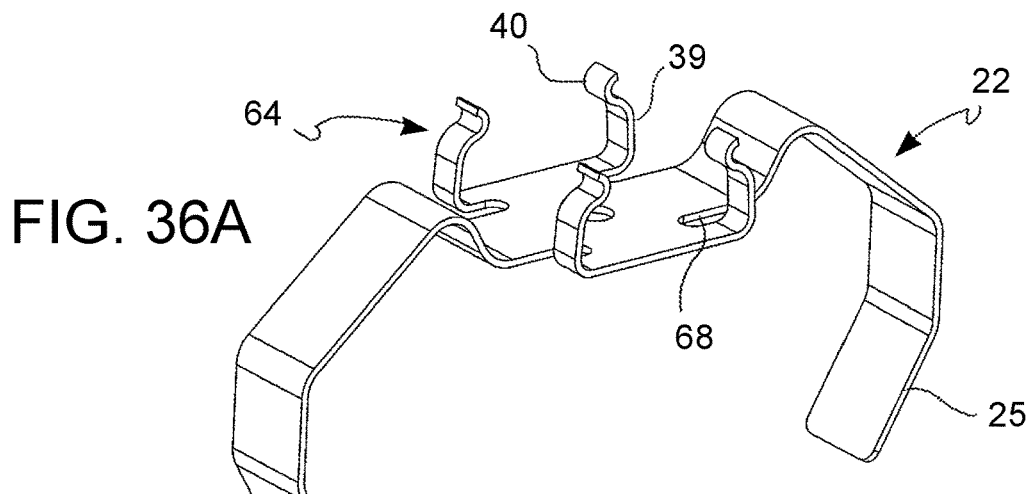
FIGS. 36A, 36B, 36C are views of a spring for friction pad adapted to be used in the disc brake according to figures from 23 to 34, according to a further embodiment.
Figure 36B:
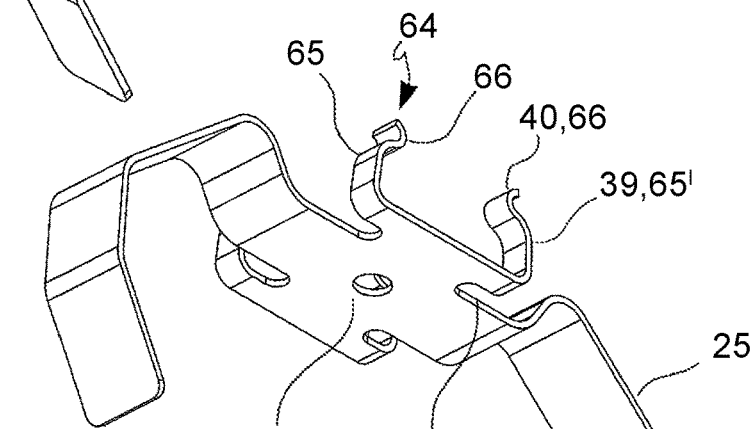
Figure 36C:
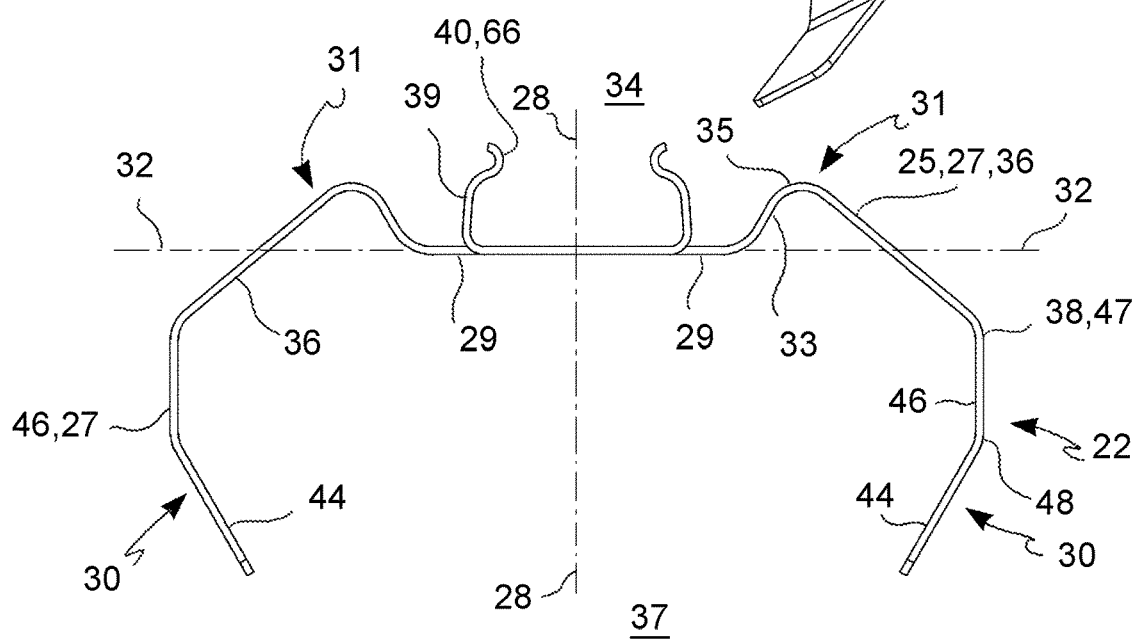

The disc brake 1 further comprises at least one pad spring 22 which applies an elastic preload onto the pads 11 to keep the friction pads 11 spaced apart from the brake disc 3 with the brake deactivated. The same one or more springs 22 or one or more additional springs 24 (e.g. shown in FIGS. 23, 28, 29) may perform the further function of stopping the friction pads 11 elastically in the seats 14, thereby reducing the onset of vibrations and noise due to movements of the pads with respect to the caliper 2 with the brake deactivated.

Detailed Description of the Spring 22

Generally, the disc brake 1 may comprise two springs 22, each of which is respectively associated with two opposite friction pads 11 placed in elastic pressing contact against both the opposite friction pads 11.

Detailed Description of the Transverse Elongated Plate 25 of the Spring 22

The spring 22 comprises a traverse elongated plate 25 with a central stretch 26 and two opposite transverse portions 27, extending from the central stretch 26 in two opposite transverse directions with respect to a longitudinal median plane 28 (geometric, not material) of the spring 22 and each forming in turn a supporting stretch 29, a resting stretch 30 and a wing stretch 31 extending between the supporting stretch 29 and the resting stretch 30 (FIGS. 10D, 22B, 22D, 35D, 36C, 37D).

The supporting stretches 29 are adjacent to (or directly border on) the central stretch 26 and oriented so that both supporting stretches 29 extend or lie in the same supporting plane 32 (geometric, not material) transverse, possibly orthogonal, to the longitudinal median plane 28.

The wing stretches 31 are adjacent to (or directly bordering) the respective supporting section 29 and comprise:

an ascending wing stretch 33 extending from the supporting stretch 29 away from the supporting plane 32 towards an upper side 34 of the spring 22 and away from the longitudinal median plane 28 to an upper apical point (or region) 35, a descending wing stretch 36 extending from the upper apical point (or region) 35 further away from the longitudinal median plane 28 and towards a lower side 37 of the spring 22 up to a folding line 38 which connects the wing stretch 31 to the resting stretch 30, in which the descending wing stretch 36 possibly crosses the supporting plane 32 and the folding line 38 is formed at a distance from the supporting plane 32 on an opposite side with respect to the upper apical point (or region) 35.

The spring 22 further comprises one or more fixing stretches 39 either connected to or formed at the central stretch 26 of the transverse elongated plate 25 and forming at least two opposite fixing portions 40 for an elastic snap-fixing to corresponding fixing seats 41 of the caliper 2.

According to an embodiment (FIGS. 35A-35D) the two opposite transverse stretches 27 of the spring 22 may also form an arch-shaped yielding stretch 43, e.g. formed either in the resting stretch 30 or between the resting stretch 30 and the wing stretch 31, wherein the yielding stretch 43 develops from two substantially opposite and facing folding lines 42, in the shape of a loop or an arc of a circle, possibly larger than a distance between the two facing folding lines 42. The yielding stretch provides a further bending length adapted to accumulate elastic deformation energy and to further uniform the elastic thrust of the spring in the different axial positions of the friction pads 11.

Preferably, the yielding stretch 43 protrudes in a direction away from the longitudinal median plane 28 and extends at a distance from the supporting plane 32 and displaced from the latter toward the lower side 37 of the spring 22.

The resting stretch 30 forms a plate-shaped contact portion 44, preferably planar, for a free abutment (with possibility of sliding) of the spring 22 against a corresponding contact surface 45 formed at the support plate 12 of the friction pad 11, as well as an intermediate portion 46 extending between the wing stretch 31 and the contact portion 44 and possibly delimited by two folding lines 47, 48. With the spring 22 undeformed, the intermediate plate-shaped portion 46 extends transversely with respect to the supporting plane 32 towards the lower side 37 of the spring 22 and the contact portion 44 is folded with respect to the intermediate portion 46 and extends, starting from a folding edge 48 formed between the contact portion 44 and the intermediate portion 46, so as to diverge with respect to the supporting plane 32 (and thus with respect to the supporting stretch 29) and towards the longitudinal median plane 28.

According to embodiments, the ratios between two or more of the lengths of the individual stretches of the opposite transverse portions 27 are within the ranges listed in the following tables, in which:

L29 is the extension of the supporting stretch 29 measured from the longitudinal median plane 28 up to the wing stretch 31,
L33 is the length of the ascending wing stretch 33,
L36 is the length of the descending wing stretch 36,
L46 is the length of the intermediate stretch 46 of the resting stretch 30,
L44 is the length of the of the contact portion 44 of the resting stretch 30.

|     | L29  | L33       | L36       | L46       | L44       |
| --- | ---- | --------- | --------- | --------- | --------- |
| L29 | 1.00 | 0.35-0.95 | 1.22-1.70 | 0.42-0.90 | 0.58-1.35 |

L33 is in the range from 0.35*L29 to 0.95*L29 and/or L36 is in the range 1.22*L29 to 1.7*L29 and/or L46 is in the range from 0.42*L29 to 0.90*L29 and/or L44 is in the range from 0.58*L29 to 1.35*L29.

|     | L29       | L33 | L36       | L46       | L44      |
| --- | --------- | --- | --------- | --------- | -------- |
| L33 | 1.07-2.56 | 1.0 | 1.78-3.19 | 0.67-1.55 | 0.9-2.01 |

L29 is in the range from 1.07*L33 to 2.56*L33 and/or L36 is in the range 1.78*L33 to 3.19*L33 and/or L46 is in the range from 0.67*L33 to 1.55*L33 and/or L44 is in the range from 0.9*L33 to 2.01*L33.

|     | L29       | L33       | L36  | L46    | L44       |
| --- | --------- | --------- | ---- | ------ | --------- |
| L36 | 0.53-0.86 | 0.22-0.63 | 1.00 | 0.3-1.6 | 0.42-0.88 |

L29 is in the range from 0.53*L36 to 0.86*L36 and/or L33 is in the range from 0.22*L36 to 0.63*L36 and/or L46 is in the range from 0.3*L36 to 1.6*L36 and/or L44 is in the range from 0.42*L36 to 0.88*L36.

|     | L29      | L33      | L36     | L46 | L44      |
| --- | -------- | -------- | ------- | --- | -------- |
| L46 | 1.15-2.0 | 0.59-1.4 | 1.9-2.6 | 1.0 | 1.2-1.66 |

L29 is in the range from 1.15*L46 to 2.0*L46 and/or L33 is in the range from 0.59*L46 to 1.4*L46 and/or L36 is in the range from 1.9*L46 to 2.6*L46 and/or L44 is in the range from 1.2*L46 to 1.66*L46.

|     | L29      | L33      | L36       | L46       | L44 |
| --- | -------- | -------- | --------- | --------- | --- |
| L44 | 0.7-1.56 | 0.42-1.1 | 1.18-2.02 | 0.54-0.87 | 1.0 |

L29 is in the range from 0.7*L44 to 1.56*L44 and/or L33 is in the range from 0.42*L44 to 1.1*L44 and/or L36 is in the range from 1.18*L44 to 2.02*L44 and/or L46 is in the range from 0.54*L44 to 0.87*L44.

According to an advantageous embodiment (FIGS. 10D, 22A), L33 is in the range from 0.8*L29 to 0.9*L29 and/or L36 is in the range 1.5*L29 to 1.7*L29 and/or L46 is in the range from 0.7*L29 to 0.9*L29 and/or L44 is in the range from 1.2*L29 to 1.35*L29.

According to an advantageous embodiment (FIG. 37D), L33 is in the range from 0.4*L29 to 0.6*L29 and/or L36 is in the range 1.25*L29 to 1.5*L29 and/or L46 is in the range from 0.6*L29 to 0.8*L29 and/or L44 is in the range from 0.8*L29 to 1.0*L29.

According to an advantageous embodiment (FIG. 36C), L33 is in the range from 0.35*L29 to 0.55*L29 and/or L36 is in the range 1.32*L29 to 1.52*L29 and/or L46 is in the range from 0.57*L29 to 0.77*L29 and/or L44 is in the range from 0.78*L29 to 1.0*L29.

According to a further advantageous embodiment (FIG. 35D), L33 is in the range from 0.85*L29 to 0.78*L29 and/or L36 is in the range 1.22*L29 to 1.42*L29 and/or L46 is in the range from 0.42*L29 to 0.62*L29 and/or L44 is in the range from 0.58*L29 to 0.78*L29.

These geometric ratios of the lengths of the individual stretches of the opposite transversal stretches 27 of the elongated transverse plate 25 have proved to be advantageous to obtain an elastic force of the spring 22 at least approximately constant or uniform in different axial positions of the friction pads 11 and in different wear conditions of the friction pads 11.

According to a preferred embodiment, the supporting stretch 29 and the ascending wing stretch 33 border with each other at a fold, preferably not sharp but rounded, and are mutually inclined by an obtuse angle of inclination.

With further advantage, the ascending wing stretch 33 and the descending wing stretch 36 are mutually adjacent at a fold, preferably not sharp but rounded, and are mutually inclined by an acute angle of inclination.

With further advantage, the descending wing stretch 36 and the intermediate portion 46 mutually border at a fold, preferably not sharp but rounded, or between them the further yielding stretch 43 (FIG. 35D) is interposed and they are mutually inclined with an obtuse angle inclination.

Similarly and with further advantage, the intermediate portion 46 and the contact portion 44 mutually border at a fold, preferably not sharp but rounded, and are mutually inclined by an obtuse angle of inclination.

Advantageously, the inclination angle α29 of the supporting stretch 29 with respect to the longitudinal median plane 28 is in the range from −10° to +10°, preferably from −5° to +5°, and/or the inclination angle α33 of the ascending wing stretch 33 with respect to the longitudinal median plane 28 is within the range from 20° to 65°, preferably 30° to 55°, the inclination angle α36 of the descending wing stretch 36 with respect to the longitudinal median plane 28 is in the range from 10° to 60°, preferably 20° to 50°, the inclination angle α46 of the intermediate portion 46 of the resting stretch 30 with respect to the longitudinal median plane 28 is in the range from −20° to +35°, preferably from −10° to +25°, and/or the inclination angle α44 of the contact portion 44 of the supporting stretch 30 with respect to the longitudinal median plane 28 is in the range from 20° to 60°, preferably 30° to 50°, preferably about 50°.

In accordance with embodiments (FIGS. 10D, 22D), the inclination angle α29 of the supporting stretch 29 with respect to the longitudinal median plane 28 is in the range from −10° to +10°, preferably from −5° to +5°, preferably about 0°, and/or the inclination angle α33 of the ascending wing stretch 33 with respect to the longitudinal median plane 28 is within the range from 25° to 45°, preferably from 30° to 40°, preferably about 35°, and/or the inclination angle α36 of the descending wing stretch 36 with respect to the longitudinal median plane 28 is in the range from 30° to 50°, preferably 35° to 45°, preferably about 38°, and/or the inclination angle α46 of the intermediate portion 46 of the resting stretch 30 with respect to the longitudinal median plane 28 is in the range from 15° to 35°, preferably from 20° to 30°, preferably about 25°, and/or the inclination angle α44 of the contact portion 44 of the resting stretch 30 with respect to the longitudinal median plane 28 is in the range from 40° to 60°, preferably from 45° to 55°, preferably about 50°.

In accordance with further embodiments (FIGS. 36C, 37D), the inclination angle α29 of the supporting stretch 29 with respect to the longitudinal median plane 28 is in the range from −15° to +15°, preferably from −5° to +5°, preferably about 0°, and/or the inclination angle α33 of the ascending wing stretch 33 with respect to the longitudinal median plane 28 is within the range from 20° to 40°, preferably from 25° to 35°, preferably about 30° and/or the inclination angle α36 of the descending wing stretch 36 with respect to the longitudinal median plane 28 is in the range from 40° to 60°, preferably 45° to 55°, preferably about 50°, and/or the inclination angle α46 of the intermediate portion 46 of the resting stretch 30 with respect to the longitudinal median plane 28 is in the range from −10° to +10°, preferably from −5° to +5°, preferably about 0°, and/or the inclination angle α44 of the contact portion 44 of the supporting stretch 30 with respect to the longitudinal median plane 28 is in the range from 20° to 40°, preferably 25° to 35°, preferably about 30°.

In accordance with a still further embodiment (FIG. 35D), the inclination angle α29 of the supporting stretch 29 with respect to the longitudinal median plane 28 is in the range from −10° to +10°, preferably from −5° to +5°, preferably about 0°, and/or the inclination angle α33 of the ascending wing stretch 33 with respect to the longitudinal median plane 28 is within the range from 45° to 65°, preferably from 50° to 60°, preferably about 55° and/or the inclination angle α36 of the descending wing stretch 36 with respect to the longitudinal median plane 28 is in the range from 10° to 30°, preferably 15° to 25°, preferably about 19°, and/or the inclination angle α46 of the intermediate portion 46 of the resting stretch 30 with respect to the longitudinal median plane 28 is in the range from 0° to −20°, preferably from −5° to −15°, preferably about −10°, and/or the inclination angle α44 of the contact portion 44 of the supporting stretch 30 with respect to the longitudinal median plane 28 is in the range from 30° to 50°, preferably 35° to 45°, preferably about 40°.

The geometrical values described are indicated only in FIG. 10D, but apply similarly to FIGS. 22D, 35D, 36C, 37D, where they are not expressly marked to avoid cluttering the figure.

The choice of the inclinations of the opposite individual stretches 27 of the elongated transverse plate 25 is such as to ensure a sufficient bending length of the spring 22 to accumulate the elastic energy necessary to bias the friction pads 11, as well as for an advantageous positioning of the springs 22 towards the inside of the caliper 2.

The aforesaid explanations regarding the inclination angles and the lengths of the stretches and of the portions of the transverse elongated plate 25 refer to FIG. 10D and to the corresponding figures of the other embodiments and therefore refer to a section or projection of the spring 22 on a transverse median plane 49 orthogonal to the longitudinal median plane 28 and also perpendicular to the supporting plane 32.

Advantageously, the spring 22 and/or elongated transverse plate 25 have a symmetrical or symmetrical specular shape with respect to the longitudinal median plane 28.

Detailed Description of the Fixing Stretches 39 of the Spring 22

According to embodiments (FIGS. 10A-10D, 22A—22D), the spring 22 further comprises a longitudinal elongated plate 50 with a supporting portion 51 at the central stretch 26 of the transverse elongated plate 25 (e.g. either coincident with, formed in one piece with or connected to one another, e.g. by means of rivet or TOX) and with the two longitudinal fixing stretches 39, extending from the supporting stretch 51 in two opposite longitudinal directions with respect to a transverse median plane 49 (geometric, not material) of the spring 22, said transverse median plane being orthogonal to the longitudinal median plane 28 and, preferably, orthogonal to the supporting plane 32.

With the spring 22 undeformed, the supporting portion 51 is oriented substantially parallel to the supporting plane 32. The longitudinal fixing stretches 39 form a longitudinal ascending stretch 52 extending from the supporting stretch 51 away from the supporting plane 32 towards the upper side 34 of the spring 22 and away from the transverse median plane 49 towards the upper fixing stretch 53 of the said snap-fixing portions 40, as well as a longitudinal descending stretch 54 extending from the supporting portion 51 away from the supporting plane 32 towards the lower side 37 of the spring 22 and away from the transverse median plane 49 in the direction opposite to the longitudinal ascending stretch 52, towards a lower fixing portion 55 of said snap fixing portions 40 (FIG. 10C).

This allows to position the springs 22 on two opposite sides of the friction pads 11 and possibly with the transverse portions 27 extending in planes parallel and perpendicular to the plane 23 of the brake disc 3 and, at the same time, fixing the springs 22 at the caliper 2 which follows a circumferential progression with respect to the rotation axis of the brake disc 3.

The ascending longitudinal stretch 52 and the descending longitudinal stretch 54 are preferably plate-shaped and substantially planar.

An extension stretch 56, preferably flat and planar and, possibly, substantially parallel to the supporting plane 32, may be formed between the longitudinal ascendant stretch 52 and the upper fixing portion 53.

According to an embodiment, the fixing portions 40 (upper 53 and lower 55) each form a "U"-shaped folded stretch, and possibly a free edge 57 folded with respect to the "U"-shaped stretch in the direction opposite to the "U"-shaped folding (FIGS. 10B, 10C, 22A, 22C).

In accordance with embodiments, the ratio between two or more of the lengths of the individual stretches of the fixing stretches 39 are in the ranges listed in the following tables, in which:

L51 is the length of the supporting portion 51,

L52 is the length of the longitudinal ascending stretch 52,

L54 is the length of the longitudinal descending stretch 54,

L56 is the length of the extension stretch 56,

|     | L51  | L52       | L54     | L56       |
| --- | ---- | --------- | ------- | --------- |
| L51 | 1.00 | 1.35-1.65 | 1.0-1.2 | 1.2-1.48  |

L52 is in the range from 1.35*L51 to 1.65*L51, preferably about 1.48*L51, and/or L54 is in the range from 1.0*L51 to 1.2*L51, preferably about 1.1*L51, and/or L56 is in the range from 1.2*L51 to 1.48*L51, preferably about 1.33*L51.

|     | L51       | L52 | L54       | L56     |
| --- | --------- | --- | --------- | ------- |
| L52 | 0.58-0.78 | 1.0 | 0.64-0.84 | 0.8-1.0 |

L51 is in the range from 0.58*L52 to 0.78*L52, preferably about 0.68*L52, and/or L54 is in the range from 0.64*L52 to 0.84*L52, preferably about 0.74*L52, and/or L56 is in the range from 0.8*L52 to 1.0*L52, preferably about 0.9*L52,

|     | L51      | L52       | L54 | L56       |
| --- | -------- | --------- | --- | --------- |
| L54 | 0.80-1.0 | 1.25-1.45 | 1.0 | 1.12-1.32 |

L51 is in the range from 0.8*L54 to 1.0*L54, preferably about 0.91*L54, and/or L52 is in the range from 1.25*L54 to 1.45*L54, preferably about 1.35*L54, and/or L56 is in the range from 1.12*L54 to 1.32*L54, preferably about 1.22*L54,

|     | L51       | L52     | L54       | L56 |
| --- | --------- | ------- | --------- | --- |
| L56 | 0.65-0.85 | 1.0-1.2 | 0.72-0.92 | 1.0 |

L51 is in the range from 0.65*L56 to 0.85*L56, preferably about 0.75*L56, and/or L52 is in the range from 1.0*L56 to 1.2*L56, preferably about 1.11*L56, and/or L54 is in the range from 0.72*L56 to 0.92*L56, preferably about 0.82*L56.

These geometric ratios of the lengths of the individual stretches of the longitudinal fixing stretches 39 of the longitudinal elongated plate 50 have proven to be advantageous to obtain an elastic balancing of the spring 22 which ensures both the desired and stable positioning and an easy insertion in the fixing seats 41 of the caliper 2.

According to a preferred embodiment, the ascending longitudinal stretch 52 and the descending longitudinal stretch 54 are inclined with respect to the supporting portion 51 by an obtuse inclination angle.

Preferably, the ascending longitudinal stretch 52 and the descending longitudinal stretch 54 border with the support portion 51 at folds, preferably not sharp but rounded (FIG. 10C).

With further advantage, the extension stretch 56 and the ascending longitudinal stretch 52 are mutually adjacent at a fold, preferably not sharp but rounded, and are mutually inclined by an obtuse angle of inclination.

Advantageously, the extension stretch 56 is substantially parallel to the supporting portion 51 and preferably also parallel to the supporting stretch 29 of the opposite transverse stretches 27.

Advantageously, the inclination angle α52 of longitudinal ascending stretch 52 with respect to the supporting plane 32 is in the range from 25° to 40°, preferably from 28° to 36°, preferably about 33°, and/or the inclination angle α54 of longitudinal descending stretch 54 with respect to the supporting plane 32 is in the range from 25° to 40°, preferably from 28° to 36°, preferably about 31°.

Possibly, the inclination angle α52 of longitudinal ascending stretch 52 with respect to the supporting plane 32 is greater than the inclination angle α54 of longitudinal descending stretch 54 with respect to the supporting plane 32.

The longitudinal elongated plate 50 is intended to be oriented in a substantially circumferential direction to the rotation axis 18 of the brake disc 3 and to develop in/along the longitudinal median plane 28 either parallel or identical to the plane 23 of the brake disc 3.

The transversal elongated plate 25 is either fixed to or formed integrally with the elongated longitudinal plate 50, in particular by means of a connection of the central portion 26 to the supporting portion 51.

According to a further embodiment (FIGS. 22A, 22B, the spring 22 may comprise an auxiliary spring 58 fixed to the transverse elongated plate 25 and forming one or more curved auxiliary wings 59 intended to rest elastically against one or more further fixing seats 64 of the caliper 2 preferably spaced from the fixing seat 41.

According to an embodiment, the auxiliary spring 58 forms two auxiliary wings 59, preferably parallel, extending from the supporting stretches 29 and having:

an ascending portion 60 extending from the supporting stretch 29 away from the supporting plane 32 towards an upper side 34 of the spring 22 and away from the transverse median plane 49 up to an upper return point 61, a descending portion 62 extending from the upper return point 61 further away from the transverse median plane 49 and towards the lower side 37 of the spring 22 up to a hook-shaped end portion 63 folded towards the transverse median plane 49, in which the descending portion 62 crosses the supporting plane 32 and the end portion 63 is formed at a distance from the supporting plane 32 on an opposite side with respect to the upper return point 61.

According to further embodiments (FIGS. 35A-35D, 36A-36C) the fixing stretches 39 form two pairs 64 of respectively two mutually opposite and facing elastic tongues 65, 65', where the two elastic tongues 65, 65' respectively of the pairs 64 extend on two opposite sides and at a distance from the longitudinal median plane 28 and elastically bend towards and away from the longitudinal median plane 28. Preferably, the two elastic tongues 65, 65' of each pair 64 are symmetric or mirror symmetric with respect to the longitudinal median plane 28.

With further advantage, the two pairs 64 of elastic tongues extend on two opposite sides and at a distance from the transverse median plane 49 and may be preferably symmetric or specularly symmetric with respect to the transverse median plane 49.

The elastic tongues 65, 65' form protuberances 66 adapted to engage corresponding cavities 67 of the caliper 2 to make an elastic snap-fixing having an anti-detachment effect or an anti-extraction effect of the spring 22 from the caliper 2.

Advantageously, slots 68 are formed between the pairs 64 of elastic tongues 65, 65' and adjacent supporting stretches 29 of the transverse elongated plate 25, thanks to which slots 68 the free bending length of the elastic tongues 65, 65' becomes longer.

In accordance with a further embodiment (FIGS. 37A-37D), the same central stretch 26 of the elongated transversal plate 25 forms the fixing stretches 39 and, hence, the snap fixing portions 40.

According to an embodiment, the central stretch 26 is folded in the shape of a channel open towards the lower side 37 of the spring 22, said channel having a trapezoidal cross-section with closed larger base 70 facing the upper side 34 of the spring 22, the smaller open base 71 facing towards the lower side 37, and two side walls 69 each forming a recess or opening 72 for receiving by snapping a corresponding protrusion or tooth 73 of the caliper 2 (FIG. 37A).

According to embodiments (FIGS. 35A, 36A, 37A), the spring 22 is formed in one piece, preferably of plate-shaped or strip-shaped metallic material shaped so as to have only curvatures about axes substantially parallel to one another and substantially parallel to the plane 23 of the brake disc 3, with the spring 22 mounted in the caliper 2.

According to alternative embodiments (FIG. 10A), the transversal elongated plate 25 of the spring 22 is formed in a single piece, preferably of plate-shaped or strip-shaped metallic material shaped so as to have only curvatures about axes substantially parallel to one another and substantially parallel to the plane 23 of the brake disc 3, with the spring 22 mounted in the caliper 2, while the longitudinal elongated plate 50 can be formed in one single piece, preferably of plate-shaped or strip-shaped metallic material shaped so as to have only curvatures about axes substantially parallel to one another and substantially parallel to the rotation axis 18 of the brake disc 3, with the spring 22 fitted in the caliper 2.

The elongated transverse plate 25 and the elongated longitudinal plate 50 can be mutually connected, e.g. by riveting, TOX, welding, or made in a single piece, e.g. cut from a single piece of sheet steel for springs.

Additionally (FIG. 22A), the auxiliary spring 58 may be formed in one single piece, preferably of plate-shaped or strip-shaped metallic material shaped so as to have only curvatures about axes substantially parallel to one another and substantially parallel to the rotation plane 18 of the brake disc 3 with the spring 22 fitted in the caliper 2. The transverse elongated plate 25 and longitudinal elongated plate 50 and the auxiliary spring 58 can be mutually connected, e.g. by riveting, TOX, welding, or made in a one single piece, e.g. cut from a single piece of sheet steel for springs.

The particular configuration of the spring 22 allows it to be clamped by snap fitting to the caliper 2, as well as to freely support it (with possibility of sliding and orientation) against the friction pad 11 by means of the plate-shaped contact portion 44, as well as elastically widen distance between the central stretch 26 of the spring 22 and the resting stretch 25, against the elastic resistance generated by the opposite transverse stretches 27, in particular of the wing stretches 31. By virtue of its high enlargement capacity by elastic flexing, the wing stretch 31 and, if provided, the yielding stretch 43, provide a sufficiently strong elastic force in the direction of moving apart the opposite contact portions 44 so as to effectively push the friction pads 11 away from the brake disc 3.

According to a further embodiment (FIGS. 38A-38D), the two opposite transverse stretches 27 of the spring 22 may further form a double, arch shaped, yielding stretch 43', 43", e.g. formed in the resting stretch 30 or between the resting stretch 30 and the wing stretch 31, in which the double yielding stretch 43', 43" develops from two substantially opposite and/or facing folding lines 42', in the shape of a double loop or double arc of circle with both loops or arcs facing the same direction and mutually separated by two "Mickey Mouse ear" folds 42", possibly larger than a distance between the two facing folding lines 42'. The double yielding stretch 43', 43" provides a further bending length adapted to accumulate elastic deformation energy and to further uniform the elastic thrust of the spring in the different axial positions of the friction pads 11.

Preferably, the double yielding stretch 43', 43" protrudes in a direction away from the longitudinal median plane 28 and can extend at the supporting plane 32 (FIG. 38D).

Detailed Description of the Fixing of the Spring 22 in the Caliper 2

According to an aspect of the invention, the spring 22 is fixed in the disc brake 1 with:

the upper apical region 35 of the wing stretches 31 facing towards an upper (or radially outer) side 74 of the caliper 2, and the resting stretch 30 protruding towards a radially inner side 75 of the caliper 2, and the fixing stretches 29 extend in a transverse direction, e.g. orthogonal to the plane 23 of the brake disc 3 (or, in other words, in a direction parallel to the rotation axis 18 of the brake disc 3).

Figure 3:
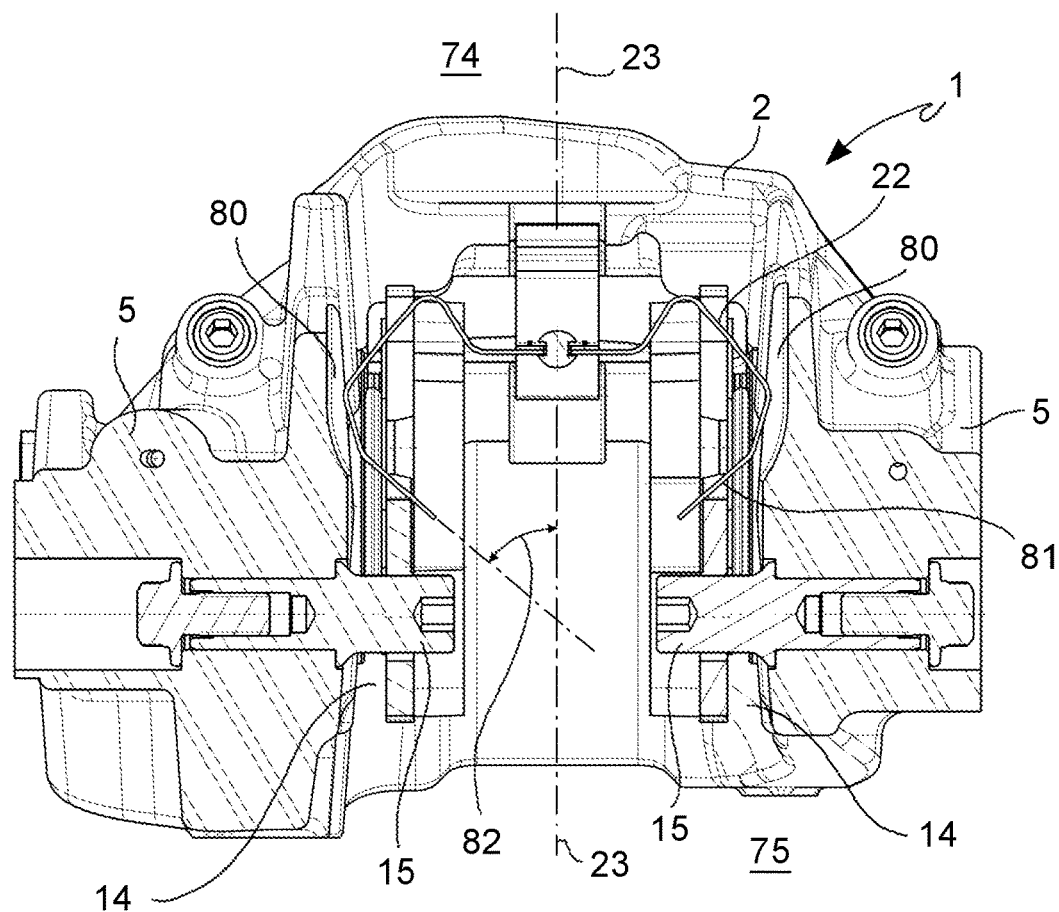
FIG. 3 is a radial section view of the disc brake in deactivated configuration (with the brake disc removed for greater clarity)
Figure 13:
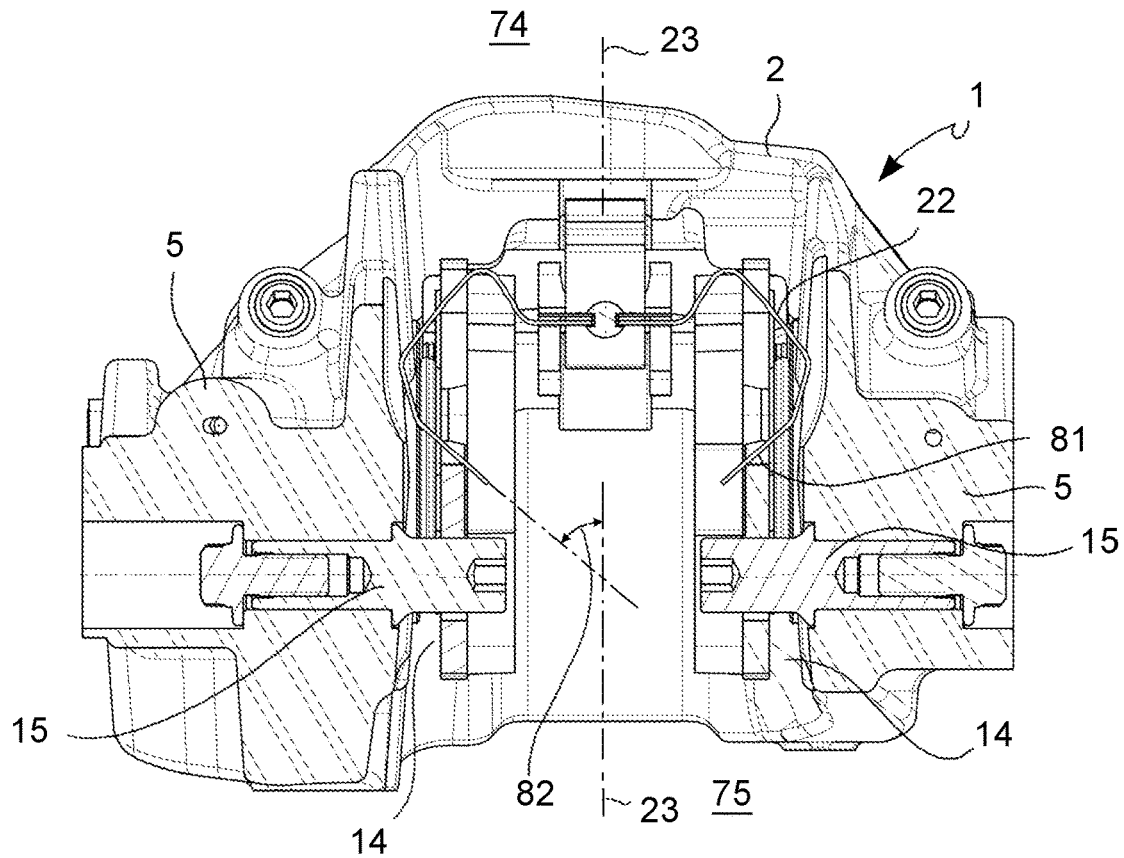
FIG. 13 is a radial section view of the disc brake in FIG. 11 in deactivated configuration (with the brake disc removed for greater clarity)
Figure 14:
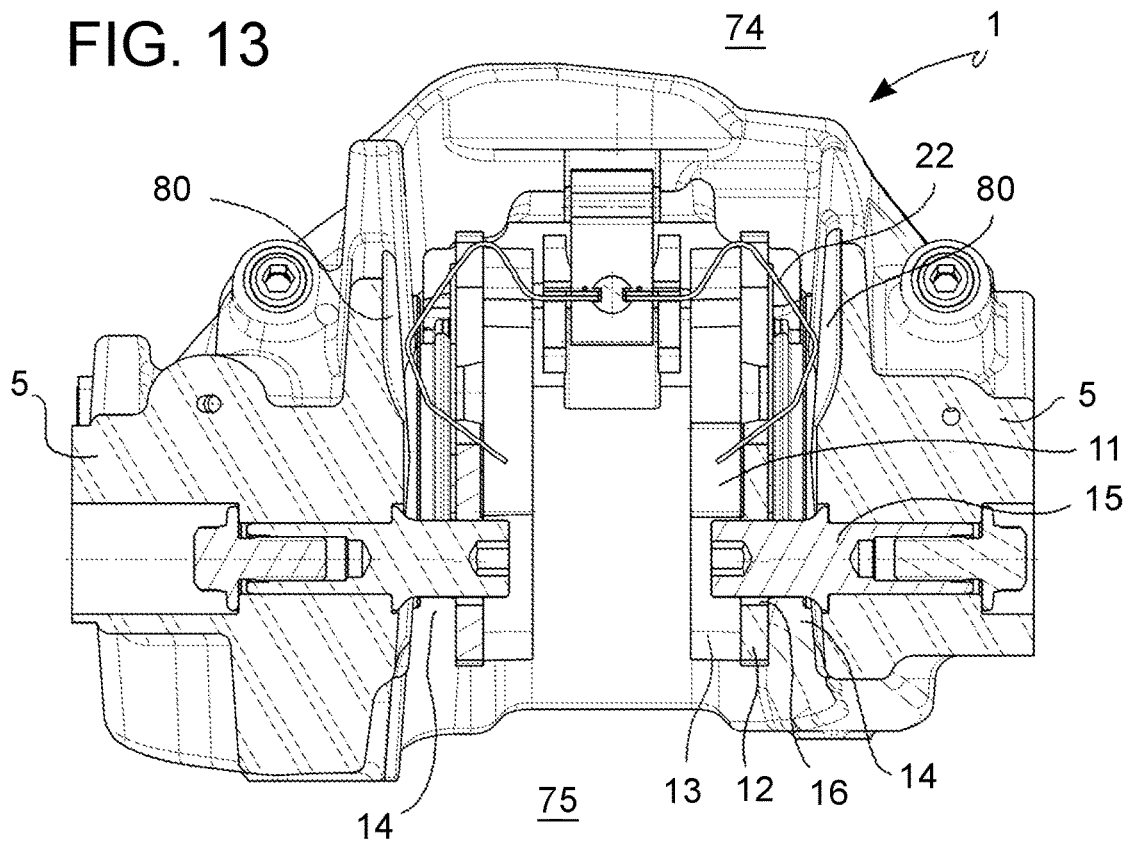
FIG. 14 shows the disc brake in FIG. 13 in an activated configuration.
Figure 15:
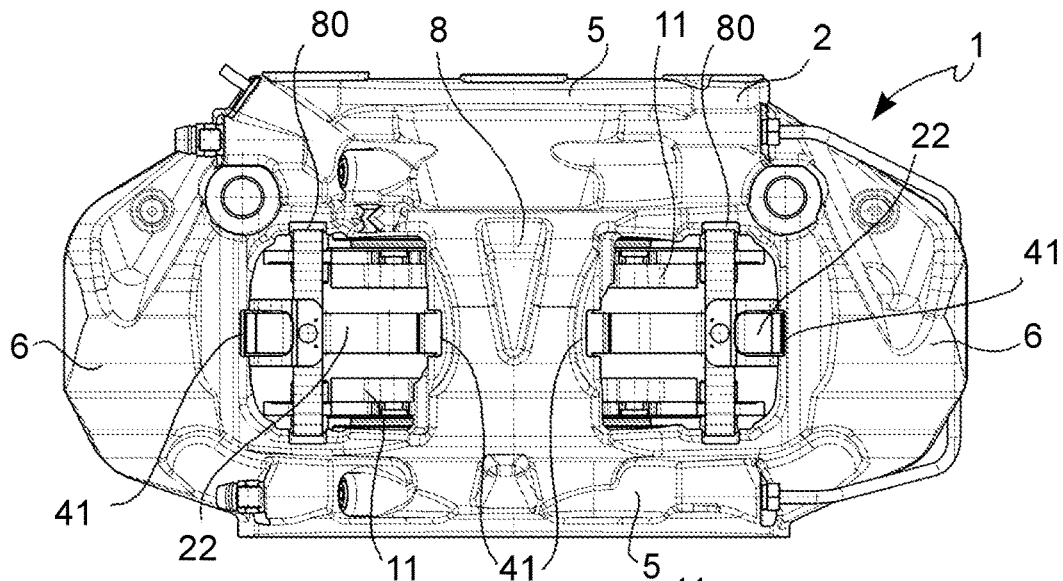
FIG. 15 is a top view of the disc brake in FIG. 11.
Figure 16:
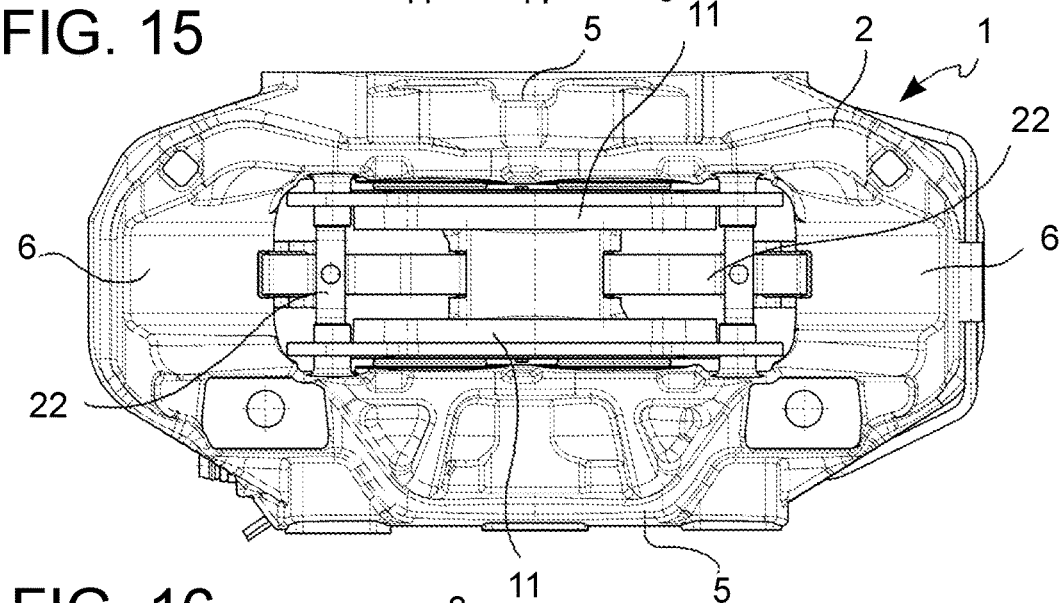
FIG. 16 is a bottom view of the disc brake in FIG. 11.
Figure 17:
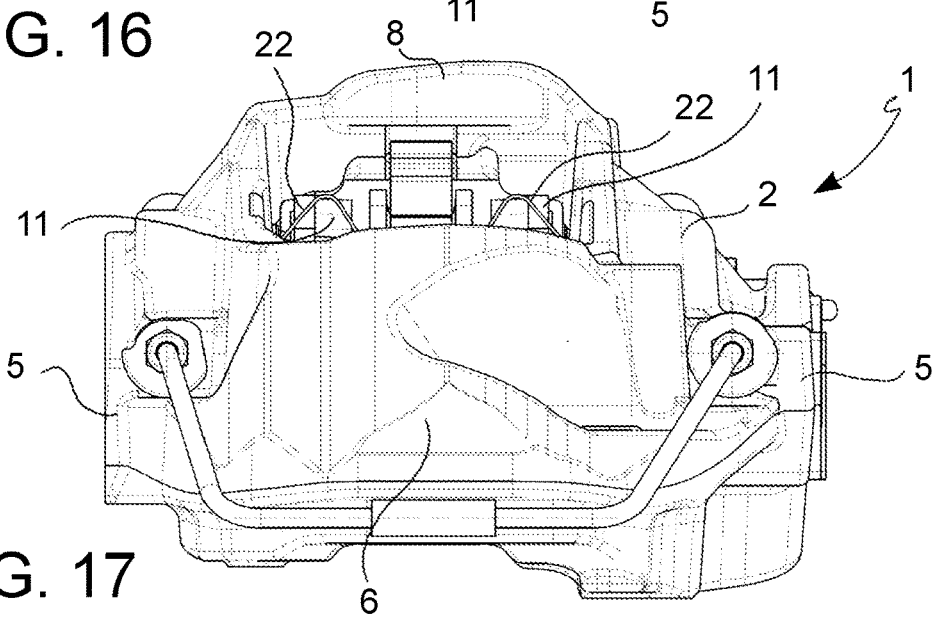
FIG. 17 is a rear view of the disc brake in FIG. 11.
Figure 25:
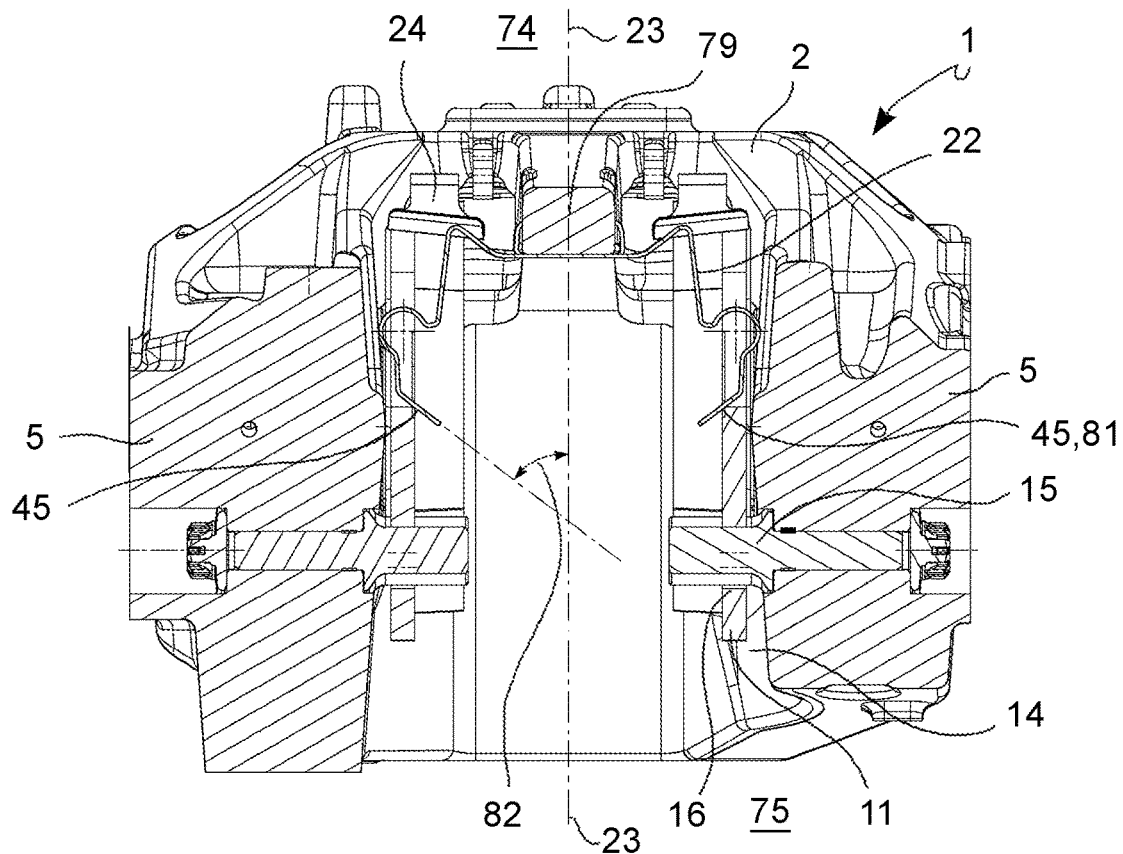
FIG. 25 is a radial section view of the disc brake in FIG. 23 in deactivated configuration (with the brake disc removed for greater clarity)
Figure 26:
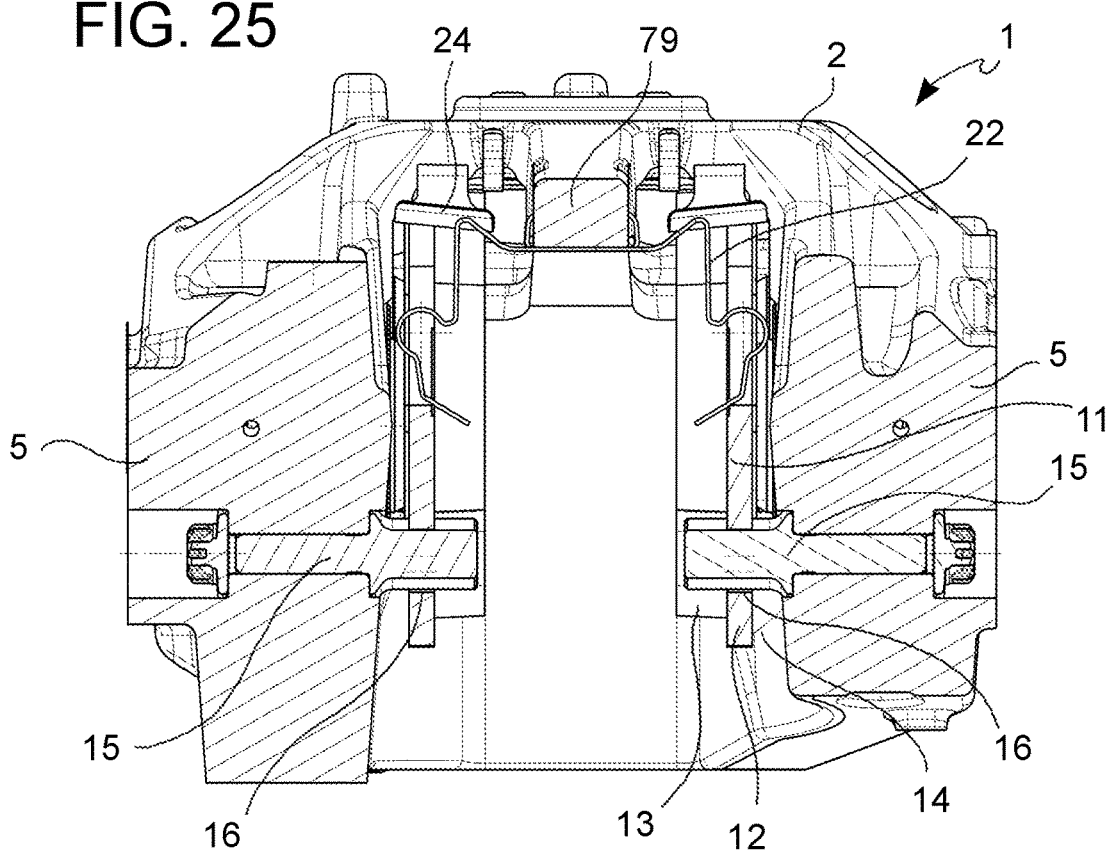
FIG. 26 shows the disc brake in FIG. 25 in an activated configuration.
Figure 27:
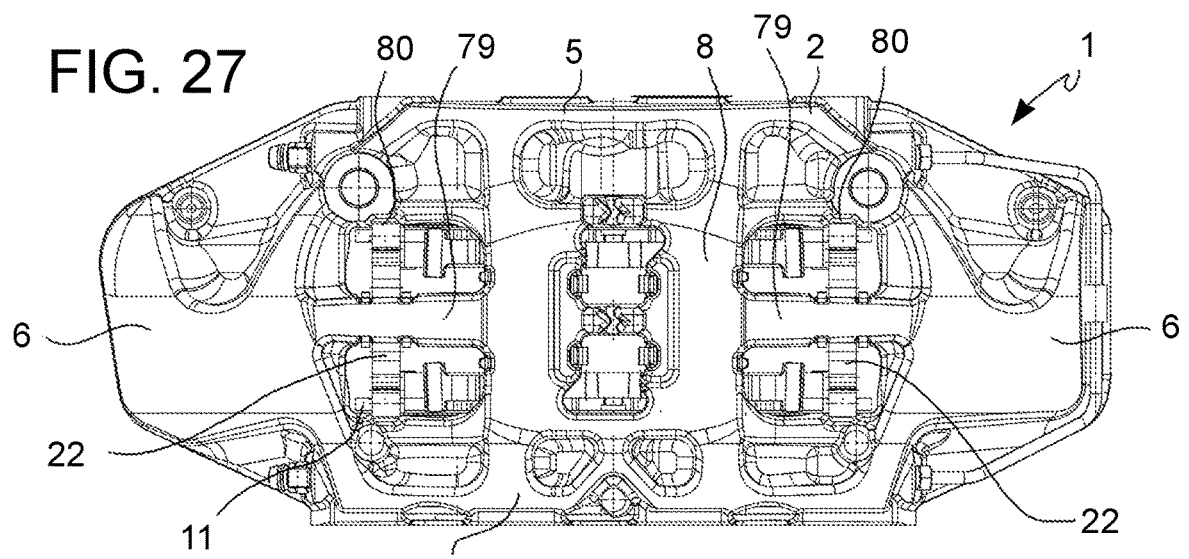
FIG. 27 is a top view of the disc brake in FIG. 23.

With further advantage, in assembled configuration, the contact portion 44 extends with an inclination angle 82, with respect to the disc plane 23, less than 60°, preferably less than 55°, e.g. either less than or equal to 45° (FIGS. 3, 13, 25).

Figure 11:
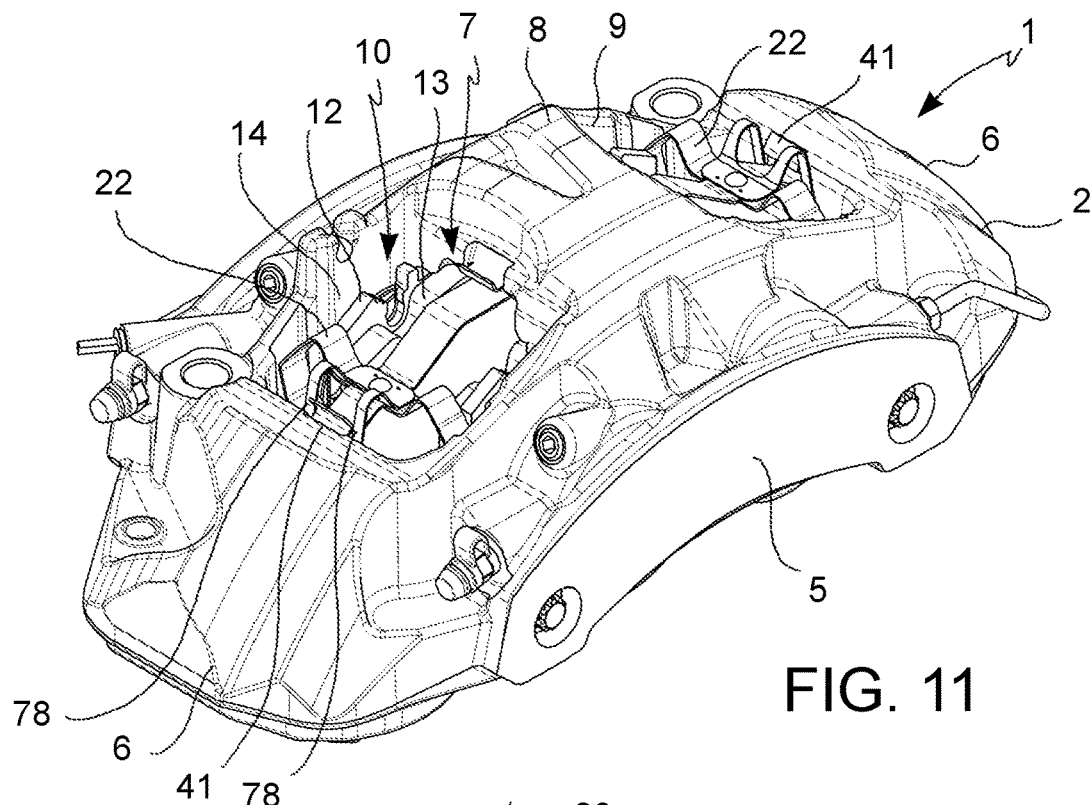
FIG. 11 is a perspective view of a disc brake according to an embodiment.
Figure 12:
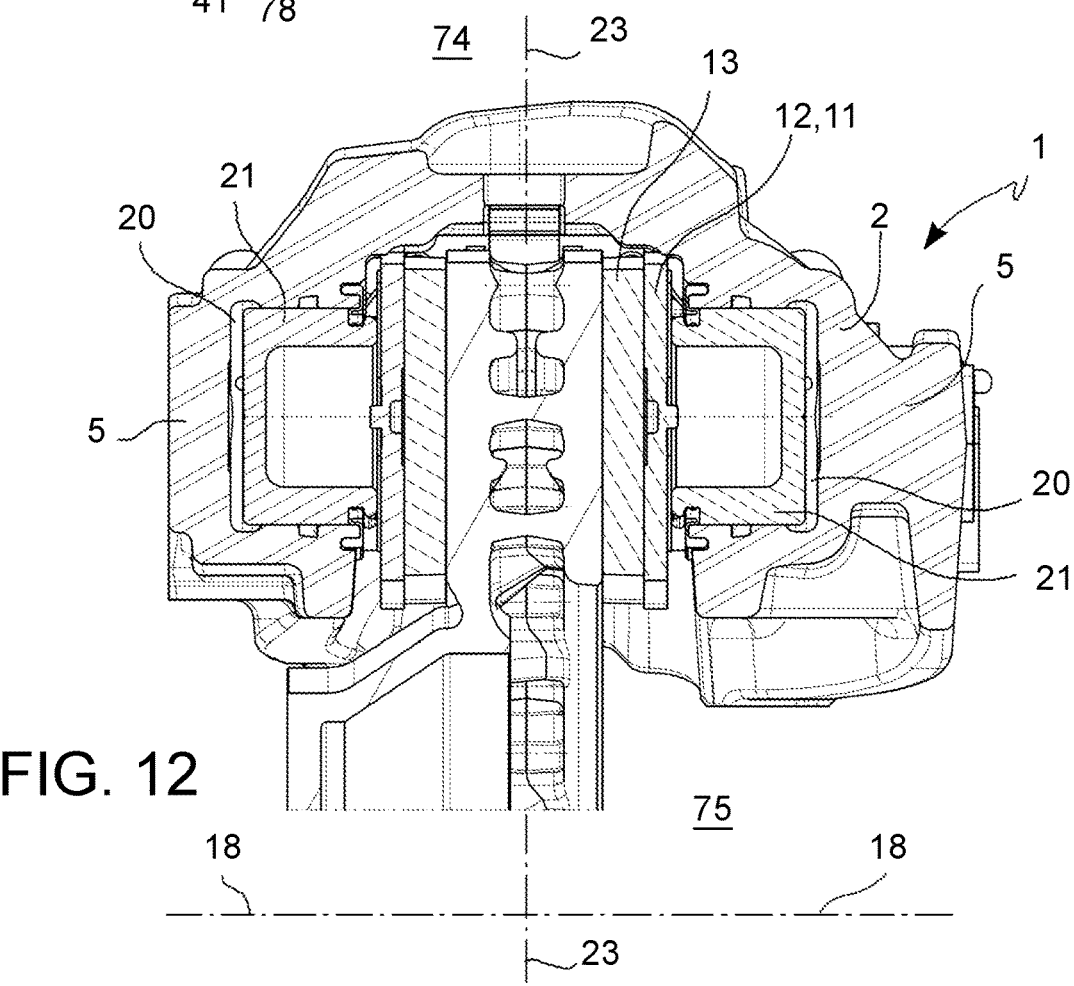
FIG. 12 is a radial section view (with respect to a rotation axis of a disc brake) of the disc brake in FIG. 11.

According to an embodiment (FIGS. 1, 11), the fixing seats 41 for fixing the springs 22 comprise fixing cavities formed in the end bridges 6 and in a central tie-rod 8 so as to accommodate the spring 22 in an aligned and mirror-symmetrical position with respect to the plane 23 of the disc brake 3. More concretely, the upper fixing portion 53 engages a fixing cavity formed in the central tie-rod 8 and the lower fixing portion 55 engages a fixing cavity formed in the end bridge 6. The same occurs for the second spring 22 on the other side of the caliper 2 with respect to the central tie-rod 8.

Figure 18:
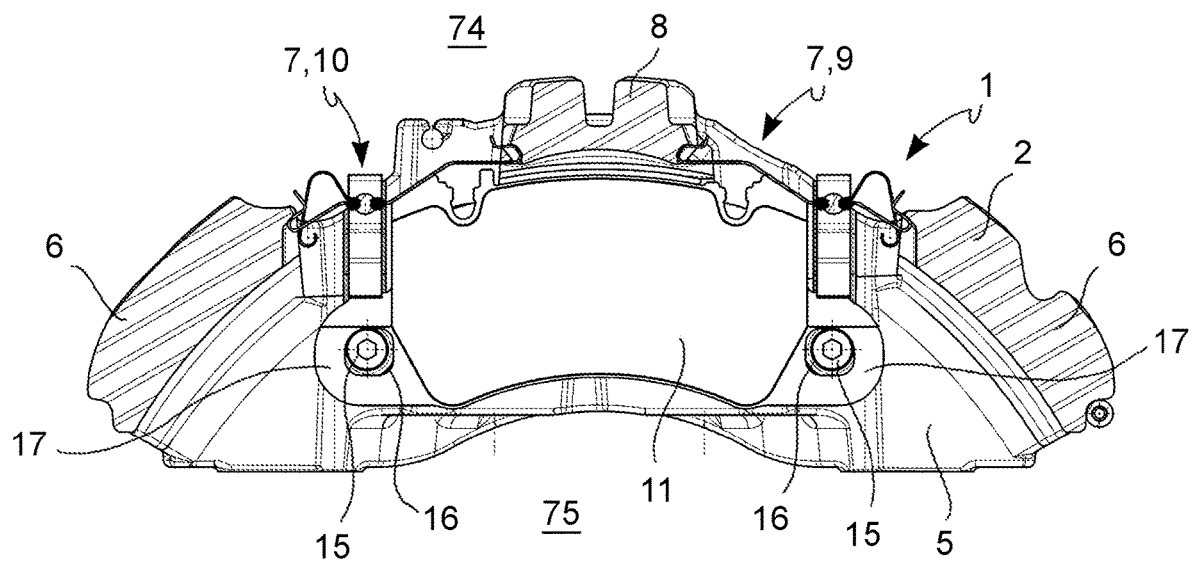
FIG. 18 is a section view of the disc brake in FIG. 11 taken along a section plane parallel to the disc plane, and with the brake disc removed for the sake of clarity.
Figure 19:
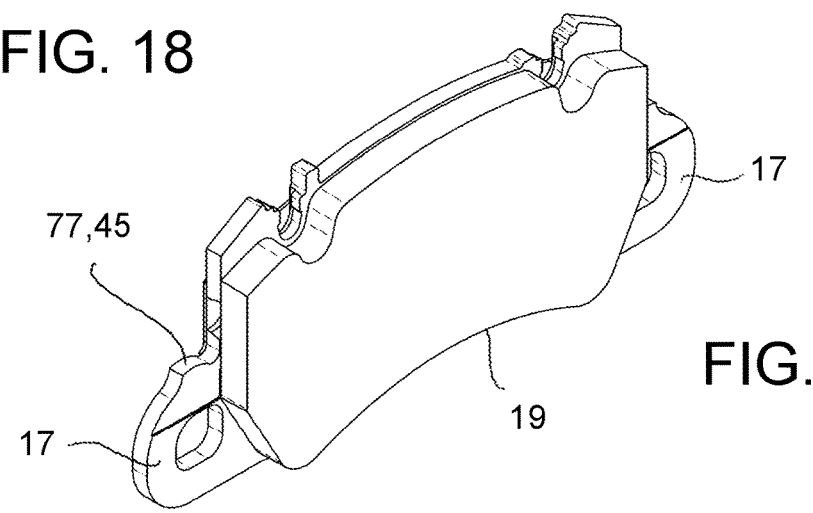
FIGS. 19, 20 show a friction pad adapted for use on a disc brake according to preferred embodiment of the invention.
Figure 20:
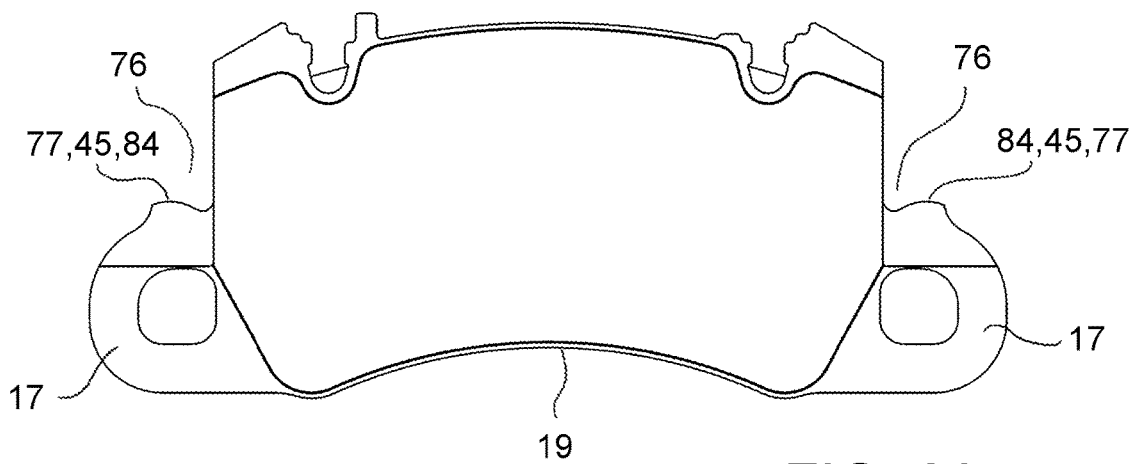
Figure 22C:
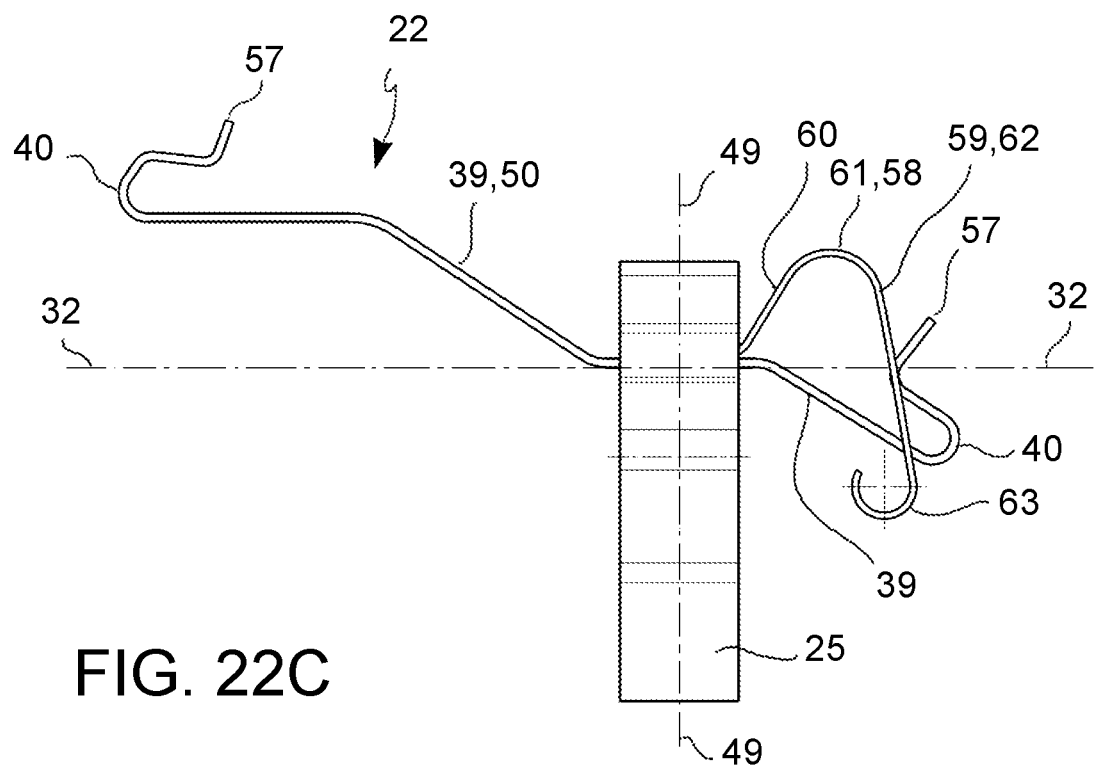
Figure 22D:
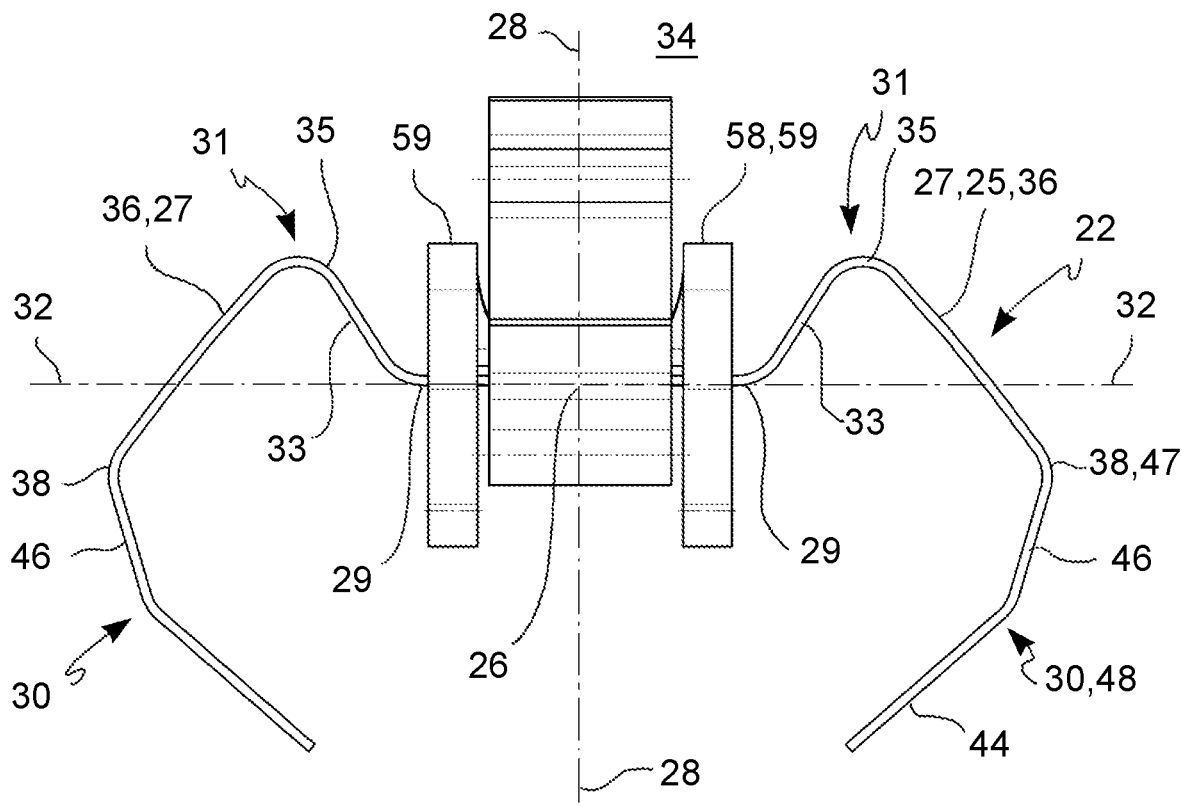

Furthermore (FIGS. 11, 18), if the auxiliary spring 58 is provided, it engages in pressing elastic contact two contrast surfaces 78 formed in the end bridge 6 on both sides of the fixing seat 41.

According to a further embodiment (FIGS. 23, 37), the caliper 2 forms one or more rigid fixing beams 79, aligned with the plane 23 of the brake disc 3, each extending from one of the end bridges 6 up to the central tie-rod 8 and/or the opposite end bridge 6, in circumferential direction to the axis 18 of the brake disc 3, and where the fixing seats 41 are formed in said one or more fixing beams 79. Again in this embodiment, the fixing seats 41 form fixing cavities or tapered areas for a certain positioning of the spring 22.

The fixing beam or beams 79 may be formed in a single piece (e.g. by casting) with the caliper 2.

Advantageously, the side walls 5 of the caliper 22 form grooves 80 extending from a radially outer side towards a radially inner side of the caliper 2 or vice versa and configured to accommodate in guided manner the transverse portions 27 of the springs 22, for an insertion of the spring 22 from the bottom or from the top, according to the embodiment.

Detailed Description of the Friction Pad 11

For preparing the space necessary for positioning the springs 22, the friction pads 11 form two lateral end recesses 76 above the aforesaid lateral end portions 17.

The lateral end portions 17 extend in a lower, i.e. radially inner, zone, of the friction pad 11, and an upper edge 77 of the lateral end portions 17 (which forms the aforesaid contact surface 45) is positioned in a radially central region having radial extension equal to one third of the total radial extension of the friction pad 11. Preferably, the upper edge 77 of the lateral end portions 17 extends to about half of the total radial extension of the friction pad 11 (FIGS. 9, 20, 21, 32).

Figure 4:
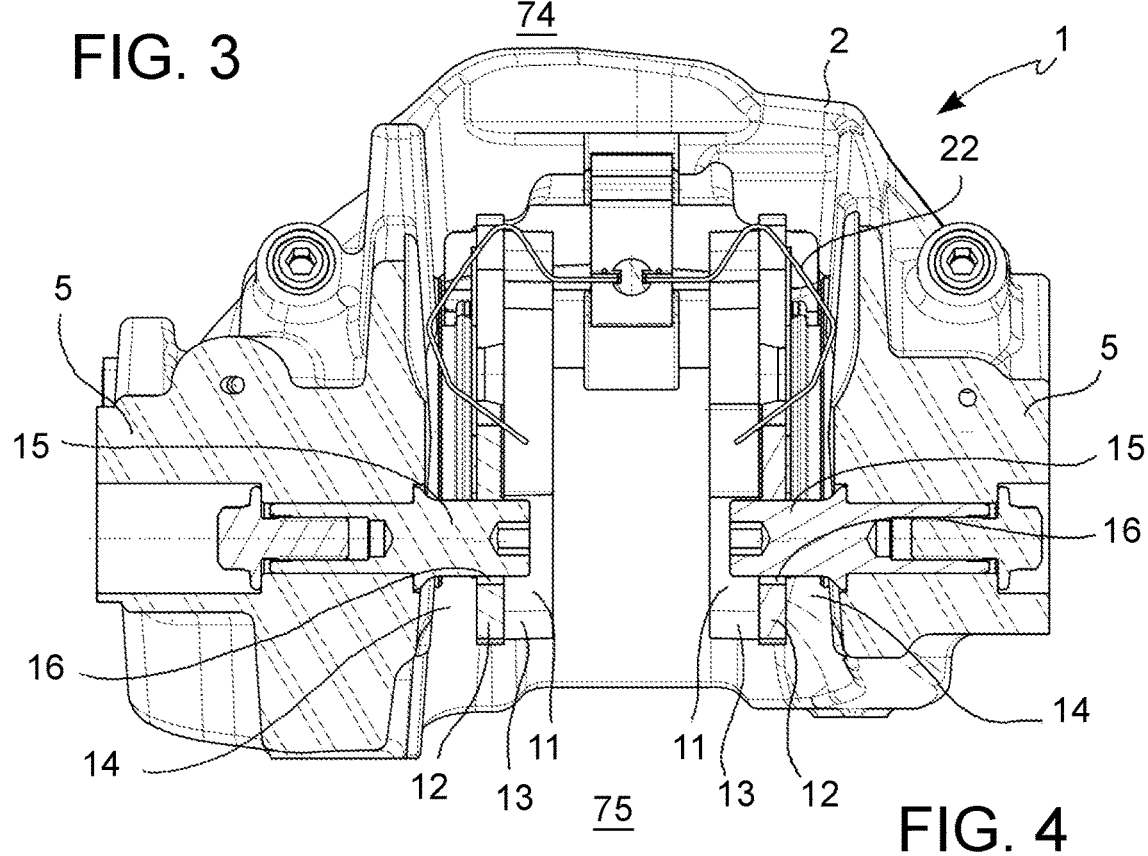
FIG. 4 shows the disc brake in FIG. 3 in an activated configuration.
Figure 5:
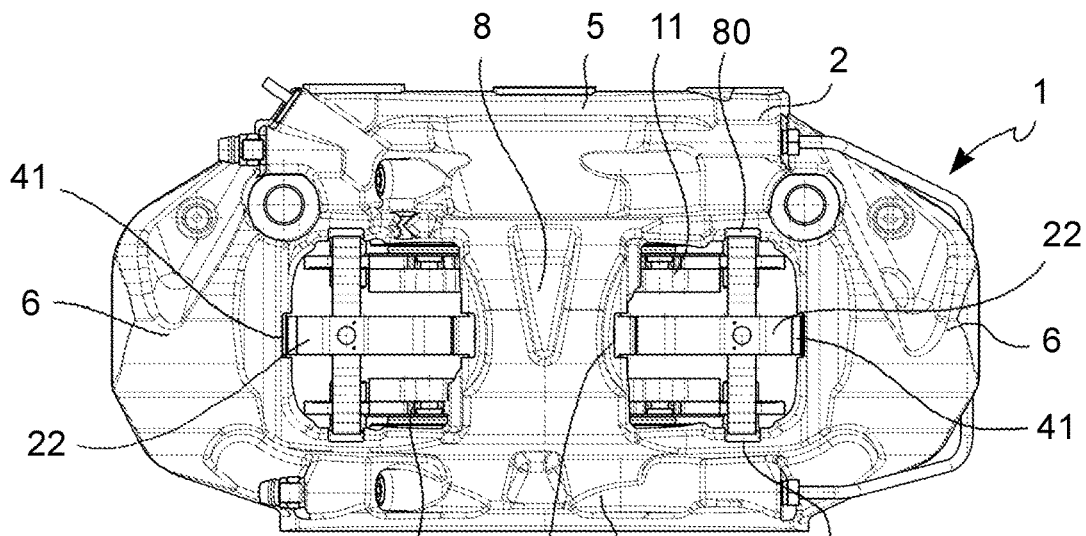
FIG. 5 is a top view of the disc brake in FIG. 1.
Figure 6:
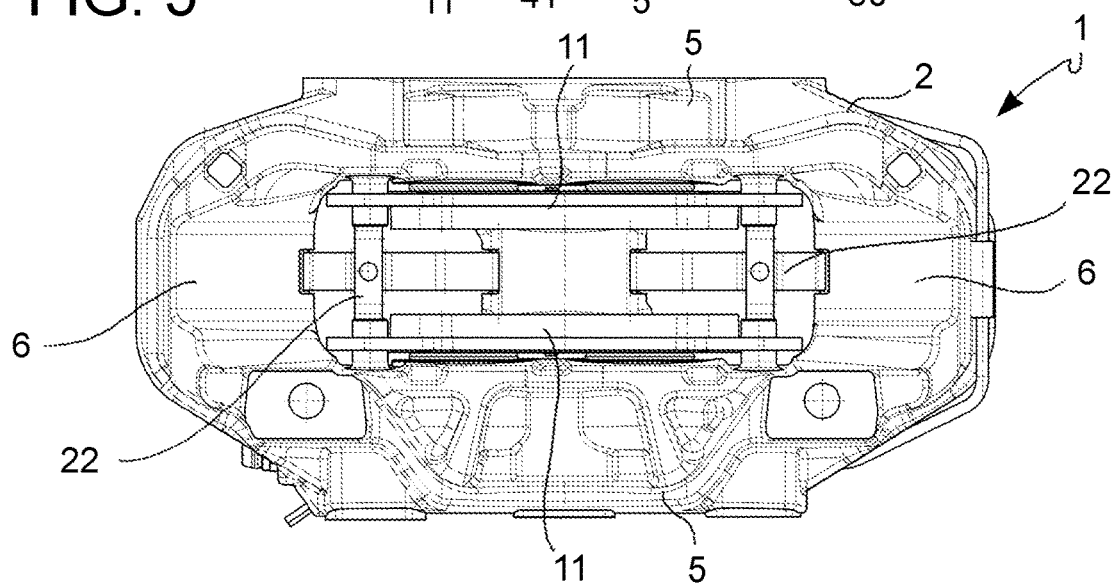
FIG. 6 is a bottom view of the disc brake in FIG. 1.
Figure 7:
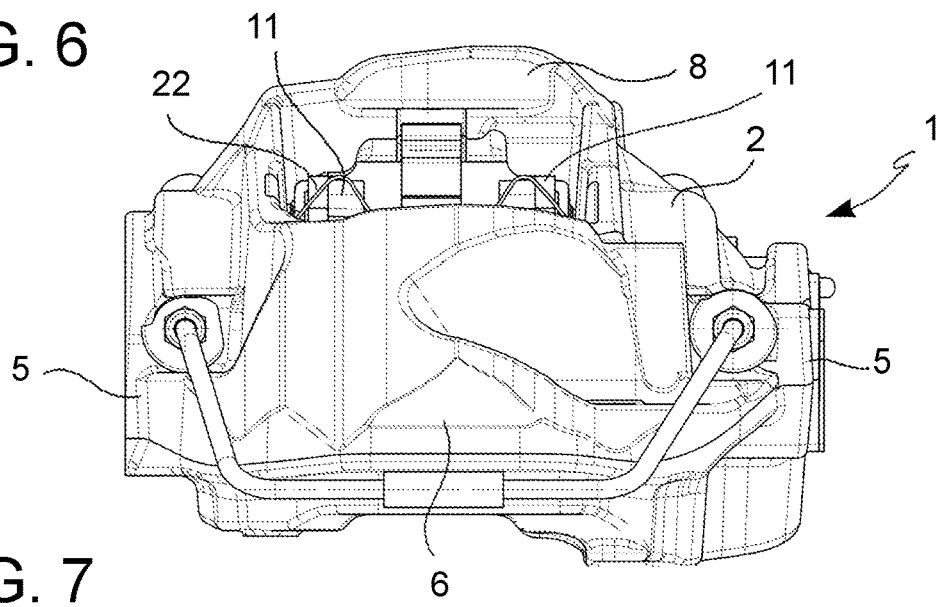
FIG. 7 is a rear view of the disc brake in FIG. 1.
Figure 8:
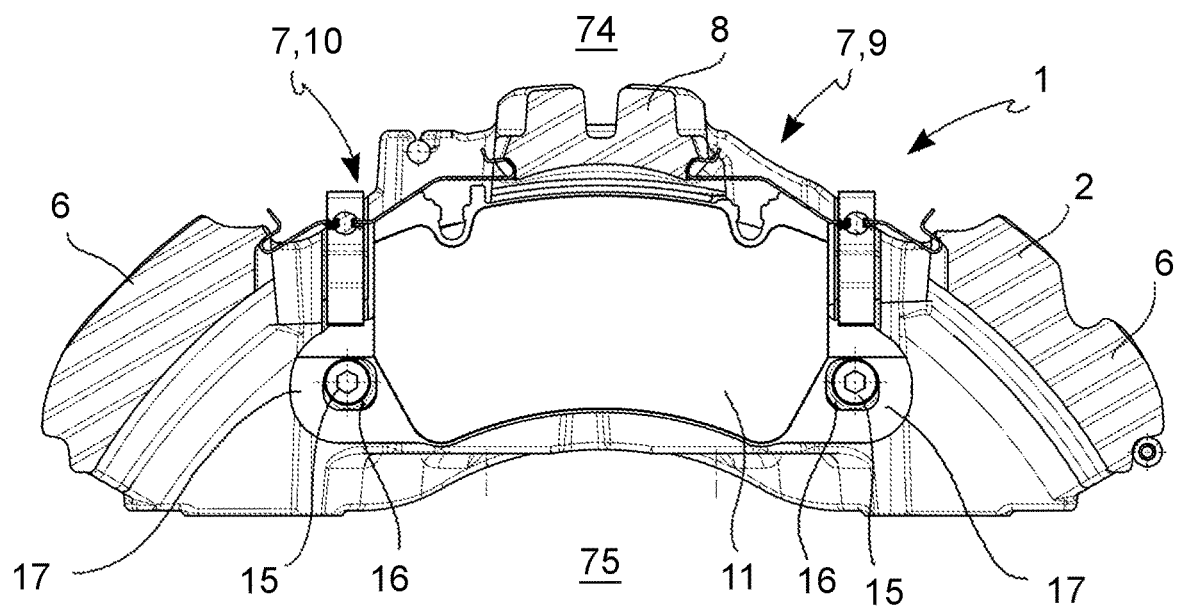
FIG. 8 is a section view of the disc brake in FIG. 1 taken along a section plane parallel to the disc plane, and with the brake disc removed for the sake of clarity.
Figure 9:
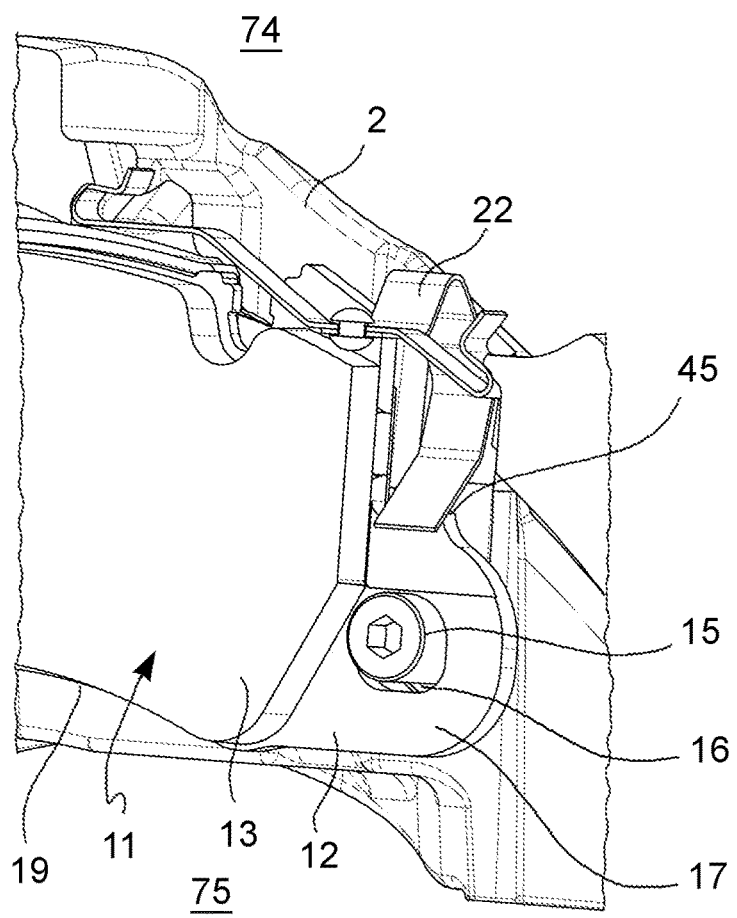
FIG. 9 is a perspective view of a detail of the disc brake in FIG. 1.

According to embodiments, the contact portion 44 of the spring 22 abuts from above (i.e. from a radially outer side in radially inner direction) against the upper edge 77 of the lateral end portion 17 of the support plate 12 of the friction pad 11 (FIGS. 4, 13, 25).

More precisely, the contact portion 44 of the spring 11 extends in inclined manner from above the side end portion 17 axially inwards (towards the brake disc 3) and radially downwards or towards the radially inner side 75 of the caliper 2 and rests in free contact and with possibility of sliding against an axially inner edge 81 of the upper edge 77.

The contact portion 44 applies on the friction pad 11 an axial elastic force in the direction away from the brake disc 3 and a radial elastic force (of not much lower intensity) towards the radially inner side 75 of the caliper 2. Indeed, the inclination angle 82 of the contact portion 44 with respect to the disc plane 23 is lower than 60°, preferably lower than 55°, e.g. lower than or equal to 45° (FIGS. 3, 13, 25), so as to transmit a considerable force with axial component (moving the pads 11 away from the brake disc 3) without however neglecting the radial bias (anti-vibration resting of the pads on the support pins 15). The fixing stretch 39 of the spring 22 applies on the caliper 2 a radial elastic force towards the radially outer side 74, while the axial elastic forces of the spring 22 will mutually balance themselves.

According to an embodiment, the contact portions 44 of the springs 22 and the respective contact surfaces 45 of the pads 11 are aligned with support pins 15 and with the support holes 16 of the friction pads 11. This has a stabilizing effect and reduces the vibrations of the pad 11.

Advantageously, both the support holes 16 of the friction pads 11 and the contact surfaces 45 engaged by their respective contact portions 44 are formed in lower, i.e. radially inner and/or lateral end appendixes, 17, i.e. circumferentially more outward than the support plate 12 inserted on the support pins 15.

According to embodiments, the lower and lateral end appendix 17 may have a radial extension equal to or less than two thirds, preferably equal to or less than half of the total radial extension (height) of the friction pad 11, as well as a circumferential extension either equal to or less than one fourth, preferably either equal to or less than one fifth, of the total circumferential extension of the pad 11.

According to embodiments, a concave chamfer (FIG. 32) or a convex bulge (FIG. 20) may be formed at the contact surface 45 in order to reduce the friction with the contact portion 44.

From the description provided, those skilled in the art will appreciate that the spring 22 for friction pad 11 and the disc brake 1 according to the invention keep the pads detached from the brake disc when the brake is deactivated, thus reducing the residual braking torque with the brake deactivated.

Furthermore, the disc brake 1 and the spring 22 according to the invention are less sensitive to geometric tolerances, to the effects of friction and to variations in the support conditions between the pads 11 and the caliper 2 and between the spring 22 and the pad 11. As a result, the springs 22 provide a more intense and more uniform axial elastic bias, even in the presence of a progressive wear of the friction lining 13 of the pads 11.

Furthermore, the spring 22 according to the invention can be easily fitted onto the caliper and on the friction pad and its position does not violate the space of other functional components of the brake, thus allowing an optimized placement and sizing targeted for each of the functional components.

Obviously, those skilled in the art may make further changes and variations to the spring 22 for pads 11 and to the disc brake 1 according to the present invention, all being within the scope of protection of the invention as defined in the following claims.

The invention claimed is:

1. A spring for friction pads associable with a caliper of a disc brake for elastically biasing the friction pads away from a brake disc of the disc brake, said spring comprising a traverse elongated plate folded so as to form a central stretch and two opposite transverse stretches, extending from the central stretch in two opposite transverse directions with respect to a longitudinal median plane of the spring, said opposite transverse stretches each forming a supporting stretch, a resting stretch and a wing stretch extending between the supporting stretch and the resting stretch, wherein the supporting stretches border on the central stretch and oriented so that both supporting stretches lie on a same supporting plane transverse to the longitudinal median plane, wherein the wing stretch borders on the respective supporting stretch and comprises:
- an ascending wing stretch extending from the supporting stretch away from the supporting plane towards an upper side of the spring and away from the longitudinal median plane to an upper apical point,
- a descending wing stretch extended from the upper apical point further away from the longitudinal median plane and towards a lower side of the spring to a folding line which connects the wing stretch to the resting stretch, wherein the spring further comprises one or more fixing stretches connected to the central stretch and forming at least two opposite fixing stretches for snap fixing the spring to fixing seats of the caliper, and wherein the resting stretch forms:
- a plate-shaped contact portion for a free sliding support against a corresponding contact surface of the friction pad,
- a plate-shaped intermediate portion extending between the wing stretch and the contact portion, wherein, with the spring undeformed, the intermediate portion extends transversely with respect to the supporting plane towards the lower side of the spring and the contact portion extends, starting from a folding edge formed between the contact portion and the intermediate portion, so as to diverge with respect to the supporting plane and towards the longitudinal median plane.

2. The spring according to claim 1, comprising a longitudinal elongated plate with a supporting portion at the central portion of the elongated transverse plate and with the two longitudinal fixing stretches extending from the supporting portion in two opposite longitudinal directions with respect to a transverse median plane of the spring,
said transverse median plane being orthogonal to the longitudinal median plane and orthogonal to the supporting plane,
wherein, with the spring undeformed, the supporting portion is oriented substantially parallel to the supporting plane and the longitudinal fixing stretches form:
- an ascending longitudinal stretch extending from the supporting portion away from the supporting plane towards the upper side of the spring and away from the transverse median plane towards an upper fixing portion of said snap fixing portions, and
- a descending longitudinal stretch extending from the supporting portion away from the supporting plane towards the lower side of the spring and away from the transverse median plane in direction opposite to the ascending longitudinal stretch, towards a lower fixing portion of said snap fixing portions.

3. The spring according to claim 2, comprising an auxiliary spring fixed to the transverse elongated plate and forming one or more curved auxiliary wings adapted to rest elastically against one or more further fixing seats of the caliper spaced from the fixing seat.

4. The spring according to claim 3, wherein the auxiliary spring forms two parallel auxiliary wings, extended from the supporting stretches and having:
- an ascending portion extending from the supporting stretch away from the supporting plane towards an upper side of the spring and away from the transverse median plane to an upper return point,
- a descending portion extended from the upper return point further away from the transverse median plane and towards the lower side of the spring up to an end portion folded back as a hook towards the median transverse plane, wherein the descending portion crosses the supporting plane and the end portion is formed at a distance from the supporting plane on an opposite side with respect to the upper return point.

5. The spring according to claim 2, wherein:
- the transverse elongated plate of the spring is formed by a single strip-shaped steel piece and has only curvatures about axes substantially parallel to one another and substantially parallel to the plane of the brake disc, with the spring mounted in the caliper and
- the longitudinal elongated plate is formed by a single strip-shaped steel piece and has only curvatures about axes substantially parallel to one another and substantially parallel to the rotation axis of the brake disc, with the spring mounted in the caliper.

6. The spring according to claim 1, wherein the fixing stretches form two pairs of respectively two mutually opposite and facing elastic tongues, wherein the two elastic tongues of respective pairs extend on two opposite sides and at a distance from the longitudinal median plane and elastically bend towards and away from the longitudinal median plane.

7. The spring according to claim 6, wherein
the two elastic tongues of each pair are symmetric with respect to the longitudinal median plane and
the two pairs of elastic tongues extend on two opposite sides and at a distance from the transverse median plane and are symmetric with respect to the transverse median plane.

8. The spring according to claim 7, wherein the elastic tongues form protuberances adapted to engage corresponding cavities of the caliper to make an elastic, detachment-proof snap engagement of the spring from the caliper.

9. The spring according to claim 6, wherein slots are formed between the pairs of elastic tongues and adjacent supporting stretches of the transverse elongated plate, which slots extend the free bending length of the elastic tongues.

10. A disc brake comprising:
- a caliper with two side walls arranged on both sides of a disc plane and forming pad seats, wherein the two side walls are connected to each other by end bridges which delimit a central opening,
- a pair of friction pads arranged in said pad seats and having a support plate bearing a friction lining and forming support holes,
- one or more support pins protruding from the side walls and inserted in the support holes for supporting the friction pads;
- one or more springs according to claim 1;

wherein the spring is fixed in the disc brake with:
- the upper apical region of the wing stretches facing a radially outer side of the caliper, and
- the resting stretch protruding towards a radially inner side of the caliper, and
- the supporting stretch extending in a direction transverse to the plane of the brake disc.

11. The disc brake according to claim 10, wherein the fixing seats for fixing the springs comprise fixing cavity formed in end bridges and in a central tie-rod of the caliper so as to accommodate the spring in an aligned and mirror symmetric position with respect to the plane of the disc brake.

12. The spring according to claim 1, wherein the two opposite transverse stretches of the spring form an arch-shaped yielding stretch, formed between the resting stretch and the wing stretch, wherein the yielding stretch develops from two folding lines which are substantially opposite and facing each other, wherein the arch-shaped yielding stretch is enlarged with respect to a distance between the two facing folding lines.

13. The spring according to claim 1, wherein:
the supporting stretch and the ascending wing stretch are mutually bordering at a fold and are mutually inclined by an obtuse angle of inclination,
the ascending wing stretch and the descending wing stretch are mutually bordering at a fold and are mutually inclined by an acute angle of inclination,
the descending wing stretch and the intermediate portion are mutually inclined by an obtuse angle of inclination,
the intermediate portion and the contact portion are mutually bordering at a fold and are mutually inclined by an obtuse angle of inclination.

14. The spring according to claim 1, wherein the central stretch of the transverse elongated plate forms the fixing stretches and is folded in the shape of a trapezoidal channel open towards the lower side of the spring and forming two side walls, each forming a recess for the snap-reception of a corresponding protrusion of the caliper.

15. The spring according to claim 1, formed by a single strip-shaped steel piece shaped so as to have only curvatures about axes substantially parallel to one another and substantially parallel to the plane of the brake disc, with the spring mounted in the caliper.

16. The spring according to claim 1, wherein the opposite transverse stretches of the spring form a double arch-shaped yielding stretch, which develops from two opposite folding lines in the shape of a double loop with both loops mutually separated by two folds and facing in the same direction.

* * * * *